(12) United States Patent
Sites

(10) Patent No.: US 7,463,775 B1
(45) Date of Patent: Dec. 9, 2008

(54) ESTIMATING COMPRESSED STORAGE SIZE OF DIGITAL DATA

(75) Inventor: Richard L. Sites, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 861 days.

(21) Appl. No.: 10/849,409

(22) Filed: May 18, 2004

(51) Int. Cl.
  *G06K 9/36* (2006.01)
  *G06K 9/46* (2006.01)
(52) U.S. Cl. .................. 382/232; 341/50; 375/240
(58) Field of Classification Search ........... 382/232
  See application file for complete search history.

(56) References Cited

U.S. PATENT DOCUMENTS

| | | | | |
|---|---|---|---|---|
| 5,121,216 A | * | 6/1992 | Chen et al. | 382/239 |
| 5,701,367 A | * | 12/1997 | Koshi et al. | 382/239 |
| 6,009,203 A | * | 12/1999 | Liu et al. | 382/233 |
| 6,072,479 A | * | 6/2000 | Ogawa | 707/104.1 |
| 6,215,820 B1 | * | 4/2001 | Bagni et al. | 375/240 |
| 6,272,235 B1 | * | 8/2001 | Bacus et al. | 382/133 |
| 6,462,681 B1 | * | 10/2002 | Van Der Vleuten et al. | 341/50 |
| 6,661,923 B1 | * | 12/2003 | Koike et al. | 382/232 |
| 6,704,358 B1 | * | 3/2004 | Li et al. | 375/240.02 |

* cited by examiner

*Primary Examiner*—Vikkram Bali
*Assistant Examiner*—Katrina Fujita
(74) *Attorney, Agent, or Firm*—Fish & Richardson P.C.

(57) ABSTRACT

Methods, systems and apparatus, including computer program products, for processing digital data. An approximate storage size is predicted for an output representation that uses variable length encoding. The approximate storage size can be used to determine one or more compression parameters to satisfy a global constraint, such as a maximum storage size for a compressed representation of the digital data. In a user interface, storage sizes can be graphically represented for multiple images. In the graphical representation, the storage size is represented for each image by a corresponding graphics object that includes a visual representation of the image and has a linear size that is proportional to the storage size of that image.

49 Claims, 13 Drawing Sheets

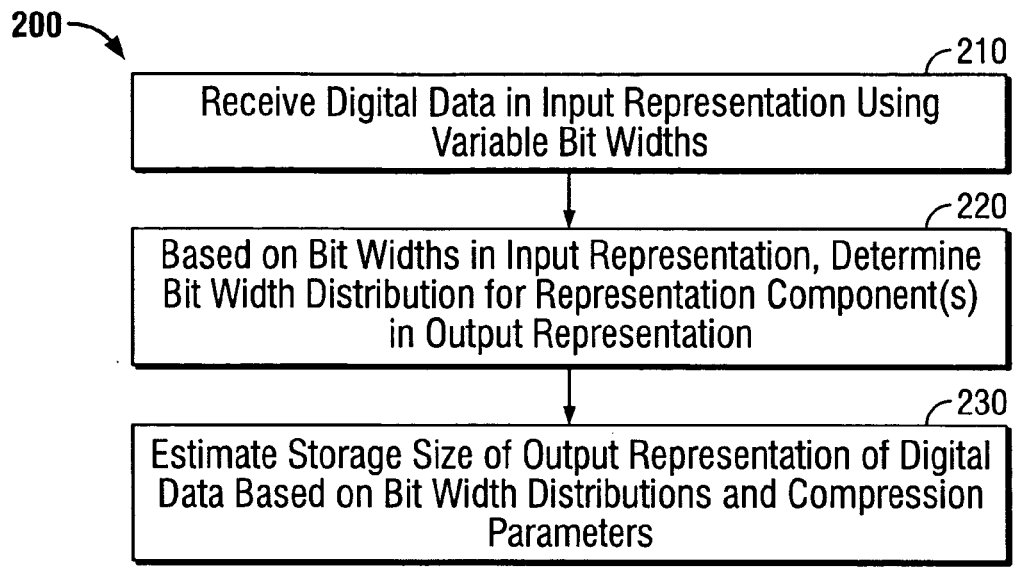
FIG. 2
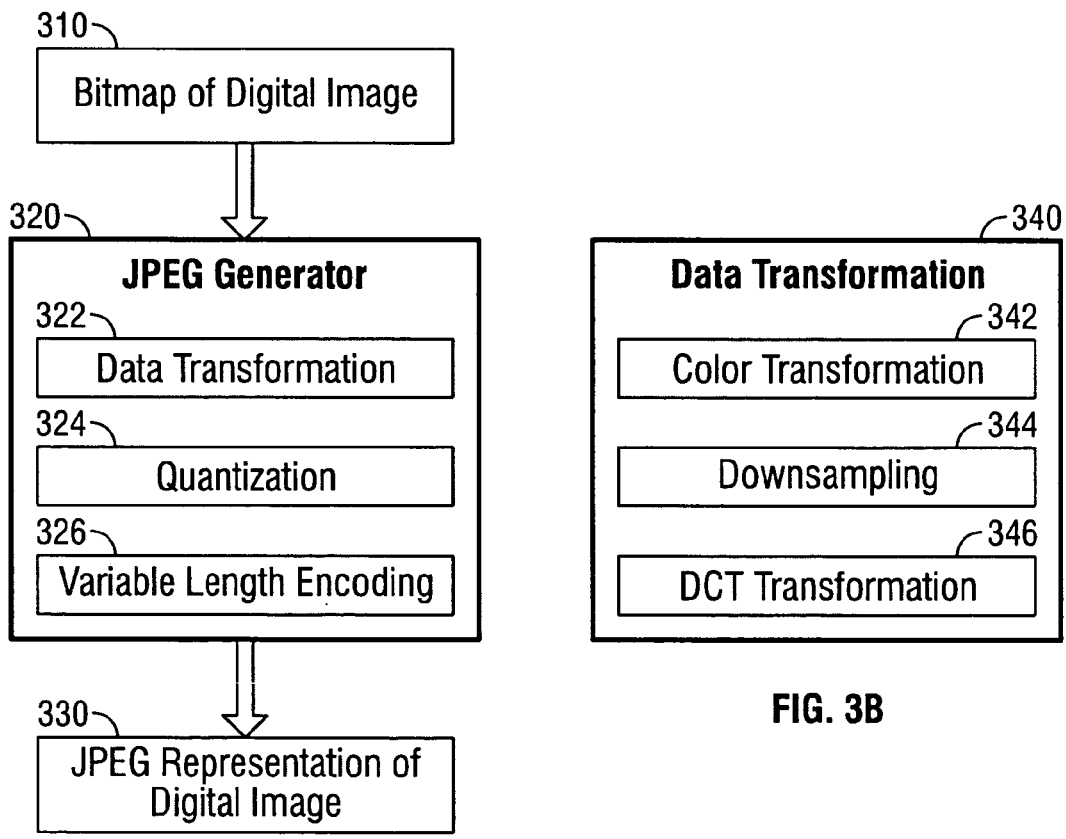
FIG. 3A
FIG. 3B

350 ⬈

| | X0 | X1 | X2 | X3 | X4 | X5 | X6 | X7 |
|---|---|---|---|---|---|---|---|---|
| Y0 | 2 | 2 | 2 | 2 | 2 | 2 | 2 | 2 |
| Y1 | 2 | 2 | 3 | 2 | 2 | 2 | 3 | 4 |
| Y2 | 3 | 2 | 2 | 3 | 4 | 5 | 4 | 4 |
| Y3 | 4 | 4 | 4 | 5 | 6 | 5 | 5 | 5 |
| Y4 | 5 | 5 | 5 | 6 | 6 | 7 | 7 | 8 |
| Y5 | 7 | 7 | 6 | 9 | 9 | 10 | 10 | 9 |
| Y6 | 9 | 12 | 12 | 12 | 12 | 12 | 12 | 12 |
| Y7 | 12 | 12 | 12 | 12 | 12 | 12 | 12 | 12 |

ESTIMATING COMPRESSED STORAGE SIZE OF DIGITAL DATA

BACKGROUND

The present invention relates to processing digital data.

Digital data can represent digital images, sound tracks or any other digitized content. In digital images, digital data represent graphics objects, such as lines, shapes, photographs, paintings or images of text. The graphics objects can be defined by vector graphics or by a raster array of closely spaced pixels that are basic picture elements. Each pixel specifies local graphical attributes, such as color or opacity of a corresponding local portion of the image. The number of pixels in an image is referred to as a resolution of the image. Pixel arrays are used in scanning, displaying and image capturing devices, and in computer applications, such as presentation, animation, painting or design applications.

A typical image includes correlations or repetitions within the pixel array. Pixel values may be correlated within a shape or along lines, or patterns or symbols may be repeated at multiple locations within the same image. For example, the same character is typically repeated at multiple locations in a scanned image of text. Compression techniques take advantage of the correlations and repetitions to generate compressed representations that are more compact than a bitmap in which each pixel is represented by a predetermined number of bits. The compressed representations can be lossy or lossless depending on whether information is lost or not from the original image due to the compression. Examples of compressed representations include Joint Photographic Experts Group ("JPEG") format, Graphics Interchange Format ("GIF"), Tagged Image File Format ("TIFF") and Joint Bi-level Image Experts Group ("JBIG") format.

A compressed representation typically includes one or more content channels for the digital data, where each content channel corresponds to a particular type of content. For example, a respective content channel can be defined for each color component in a standard color space, such as a red-green-blue (RGB) color space or a YUV color space. In the YUV color space, luminance is represented by Y, and chrominance is represented by U and V. Accordingly, the content channels can include separate Y, U and V channels. In each channel, the content is represented by data values for multiple representation components that are separately addressable components in the compressed representation.

In a JPEG representation, a respective pixel array is defined for each channel. In the array, the pixels are grouped into sub-arrays of eight-by-eight pixels. A discrete cosine transformation ("DCT") is applied to each sub-array to generate amplitude values for sixty-four different discrete frequencies (combinations of eight horizontal and eight vertical frequencies) that can be separately addressed. Thus each DCT frequency is a representation component in the JPEG representation.

In lossy representations, the information loss is typically controlled by compression parameters, such as downsampling parameters or quantizors. Each downsampling parameter defines a resolution reduction for a corresponding pixel array, and each quantizor defines a corresponding quantization of data values. For example, a horizontal or vertical downsampling parameter of two reduces by half the number of pixels in each row or each column, respectively. Or a quantizor of two defines a representation in which data can have only discrete values in units of two.

Typically, separate compression parameters are used for different content channels and different representation components. In JPEG, the chrominance channels are typically downsampled both horizontally and vertically, while the resolution is not reduced in the luminance channel. Furthermore, each DCT frequency component has a corresponding quantizor. Typically, the higher the frequency component, the larger the corresponding quantizor.

In general, digital data values can be represented according to fixed length or variable length encodings. Fixed length encodings use a fixed number of bits to represent different data values. For example in a bitmap, each pixel value is represented by a predetermined number of bits. Compressed representations, however, often use variable length encoding. In variable length encoding, different code values are represented by different number of bits. The number of bits that are used to represent a code value is referred to as the length of the code value. The code values represent data values according to an encoding. The encoding can specify a predetermined code value for each represented data values. Alternatively, the code value can depend upon the frequency of occurrence of the represented data value. To decrease storage sizes, JPEG representations typically use Huffman encoding in which the most frequent data values are represented by code values having the smallest lengths.

Before compressing a digital image into a JPEG representation or other representation using complex variable length encoding, traditional software applications do not try to predict a storage size for the compressed representation of the image. Instead, the compressed representation is actually generated, and the storage size of the generated representation is measured. If requested by a user, the measured storage size is traditionally presented in numerical form in a user interface.

For compressing an image, some computer applications allow the user to select one or more quality parameters that specify compression parameters. The compressed representation is generated with the specified compression parameters, and the storage size of the generated representation is presented to the user. If the storage size is too large or too small, the user can set new quality parameters. To verify whether the new parameters define an acceptable storage size, the user has to wait until a corresponding new compressed representation is generated. To find the quality parameters that provide the desired storage size, the user may have to guess several times, and wait each time for generating the corresponding representation. For compressing a large amount of data, such as a large number of digital images, the user may have to wait several seconds or even a few minutes between subsequent guesses.

SUMMARY

An approximate storage size is predicted for storing digital data in a representation that uses variable length encoding. The approximate storage size can be used to determine one or more compression parameters to satisfy a global constraint, such as a maximum storage size for a compressed representation of the digital data. In a user interface, storage sizes can be graphically represented for multiple images. In the graphical representation, the storage size is represented for each image by a respective graphics object that includes a representation of the image and has a linear size that is proportional to the storage size of that image.

In general, in one aspect, the invention provides methods and apparatus, including computer program products, for processing digital data. Digital data is received and code values of an input representation of the received digital data are identified. The code values have variable bit widths and represent data values for one or more representation components. For each representation component, a first bit width distribution is generated, where the first bit width distribution defines a respective frequency of occurrence for two or more different bit widths based on bit widths of data values for that representation component in the input representation. The generated first bit width distributions are used to estimate a storage size of an output representation that uses code values having variable bit widths to represent the digital data.

Particular implementations can include one or more of the following features. The digital data can be received in the input representation. The representation components can include frequency components of a discrete Fourier transform or a discrete cosine transform. The digital data can include a digital image. The input representation can include an input JPEG representation of the digital image. The output representation can include an output JPEG representation of the digital image. The input JPEG representation can be generated from a bitmap representation of the digital image. Generating the input JPEG representation can include sampling the bitmap representation of the digital image. The input representation can includes markers to identify code values, and the markers can be encoded based on a first Huffman encoding. The markers can include code heads and end-of-block markers. The output representation can include markers encoded based on a second Huffman encoding. The second Huffman encoding can be different from the first Huffman encoding. Estimating a storage size of the output representation can include estimating a total number of bits in the output representation, or estimating a transmission time for transmitting the output representation over a link.

One or more compression parameters can be received for the output representation. Estimating the storage size of the output representation can includes determining a respective bit reduction for each representation component based on one or more of the compression parameters. For each representation component, the first bit width distribution can be modified based on the respective bit reduction to generate a second bit width distribution that specifies estimated frequencies of occurrence for bit widths in the output representation. The second bit width distribution can be used to estimate the storage size of the output representation. The compression parameters can specify a respective quantizor for each representation component. Determining the respective bit reduction for each representation component can include determining the respective bit reduction based on the respective quantizor for each representation component. Estimating the storage size of the output representation can include, for each representation component, estimating a respective average number of code bits for each bit width in the second bit width distribution. Using the second bit width distribution to estimate the storage size can include multiplying the respective average number of code bits with the estimated frequencies of occurrence specified by the second bit width distribution. The corresponding average number of bits can be estimated based on bit widths in the input representation. The digital data can include a digital image, the compression parameters can specify an output pixel resolution of the digital image in the output representation, and the storage size can be estimated based on the output pixel resolution. The input representation can specify an input pixel resolution of the digital image, and estimating the storage size based on the output pixel resolution can include using a square root of the ratio of the input pixel resolution and the output pixel resolution.

In general, in another aspect, the invention provides methods and apparatus, including computer program products, for processing digital data. Digital data is received in a current representation, and one or more target parameters are received for compressing the digital data into an output representation. Based on the target parameters, one or more compression parameter values are determined for the output representation. A storage size of the output representation is predicted based on the compression parameter values, where the storage size is predicted without generating the output representation with the compression parameter values.

Particular implementations can include one or more of the following features. The output representation can use a variable length encoding to represent data values. Predicting a storage size of the output representation can include identifying code values of an input representation of the received digital data, where the code values have variable bit widths and represent data values for one or more representation components. For each representation component, a bit width distribution defining a respective frequency of occurrence for two or more different bit widths can be generated based on bit widths of data values for the representation component in the input representation. A storage size of the output representation can be estimated based on the generated bit width distributions. The digital data can be received in the input representation.

Receiving digital data can include receiving a set of two or more digital images. Predicting a storage size of the output representation can include predicting a total storage size for the set of digital images. Determining one or more compression parameter values can include selecting one or more of the images for compression and determining one or more compression parameter values for the selected images. Receiving target parameters for compressing the digital data can include receiving a target quality. One or more of the images can be selected based on the target quality and quality parameters of the digital images in the current representation. Selecting one or more of the images for compression can include selecting one or more of the images based on storage sizes of the digital images in the current representation. Selecting images based on storage sizes can include selecting one or more images that have the largest storages sizes among the received images.

Predicting the storage size of the output representation can include predicting a total number of bits in the output representation, or predicting a transmission time for transmitting the output representation over a link. Receiving one or more target parameters can include receiving user input in a user interface. The received user input can specify a sequence of input values for a target parameter. Predicting the storage size of the output representation can include predicting the storage size of the output representation for each input value in the sequence of input values. In the user interface, the predicted storage size of the output representation can be displayed for each input value in the sequence without a perceivable delay relative to the time of receiving the input value.

Receiving one or more target parameters can include receiving one or more values of a target quality parameter for the output representation, and determining one or more compression parameters can include determining one or more quantizors for the output representation based on the received values of the target quality parameter. Receiving one or more target parameters can include receiving a target storage size for the output representation. Determining one or more compression parameter values for the output representation can include setting respective trial values of one or more quality parameters for the output representation. A trial storage size can be predicted for the output representation based on the trial values, and it can be verified whether the trial storage size is smaller than the target storage size. Setting respective trial values of the quality parameters for the output representation can include setting trial values within an allowed range. The allowed range can be modified based on user input.

In general, in another aspect, the invention provides methods and apparatus, including computer program products, for processing digital data. One or more digital images are received in a current representation. In a user interface, a graphical representation is presented, where the graphical representation indicates a respective storage size for each digital image. The graphical representation includes a respective graphics object for each digital image, where the respective graphics object includes a visual representation of the digital image and has a linear size that is proportional to the storage size of the digital image.

Particular implementations can include one or more of the following features. For each digital image, the corresponding graphics object can enclose the visual representation of the image. Each digital image can be distorted in proportion to the storage size of the image. For each digital image, the corresponding graphics object can have a linear size that is proportional to the storage size of the image in the current representation. User input specifying one or more target parameters for an output representation of the images can be received. A storage size can be estimated for one or more images in the output representation based on the received target parameters. For each digital image, the linear size of the corresponding graphics object can be set to be proportional to the estimated storage size of the image in the output representation. Receiving user input specifying one or more target parameters can include presenting a respective slider for each target parameter in the user interface, wherein at least one of the sliders is a user adjustable slider. The target parameters can be specified according to a current position of the user adjustable slider. A first target parameter can have a first allowable range, and presenting a slider for the first target parameter can include presenting a representation of the first allowable range in the user interface. User input modifying the first allowable range can be received, and the representation of the first allowable range can be adjusted in the user interface. The output representation can specify two or more representation components for each image, and use code values having variable bit widths to represent data values. Estimating the storage size of one or more images in the output representation can include estimating the storage size for each representation components in the output representation based on a bit width distribution corresponding to the representation component, where the bit width distribution defines a frequency of occurrence for two or more different bit widths based on bit widths of data values for the representation component. The storage size of at least one digital image specifies a total number of bits representing the image in the output representation, or the storage size specifies a transmission time for transmitting the at least one image in the output representation over a link. A reference storage size can be presented in the user interface.

In general, in another aspect, the invention provides a system for processing digital data. The system includes an input device to receive user input specifying parameters for generating an output representation of digital data, wherein the output representation uses code values having variable bit widths to represent the digital data. The system also includes a data processing device configured to identify code values of an input representation of the digital data, wherein the code values have variable bit widths and represent data values for one or more representation components. The data processing device is also configured to generate a first bit width distribution for each representation component, and to use the generated first bit width distributions to estimate a storage size of the output representation. The first bit width distribution defines a respective frequency of occurrence for two or more different bit widths based on bit widths of data values for the representation component in the input representation.

Particular implementations can include one or more of the following features. The data processing device can include one or more components of a computer, or data processing components in a portable image capturing or image displaying device. The system can include a data storage device that has an available storage capacity to store the digital data. The data processing device can be configured to determine compression parameters for the output representation of the digital data based on the available storage capacity of the data storage device. The system can include a display device to present the estimated storage size of the output representation. The digital data can include one or more digital images, and the data processing device can be configured to generate a graphical representation to indicate a respective storage size for each digital image. The graphical representation can include a respective graphics object for each digital image, where the respective graphics object includes a visual representation of the digital image and has a linear size that is proportional to the storage size of the digital image. The display device can be configured to present the generated graphical representation.

The invention can be implemented to realize one or more of the following advantages. A storage size can be accurately predicted for compressing digital data into a compressed representation that uses variable length encoding. The storage size can be predicted without actually generating the compressed representation. Instead, the estimate is based on compression parameters and the content in the digital data. A storage size can be predicted for compressing an input digital image into a JPEG representation. The input digital image can be in any representation, such as a high quality JPEG format or a bitmap format. The storage size can be estimated and presented in a user interface without perceivable delays to a user. Even for compressing a large amount of digital data, the storage size estimation can be fast enough to present instant estimates to a user who moves a slider selecting one or more target parameters for the compression. The target parameters can include a maximum storage size or one or more parameters related to information loss due to the compression of the digital data. For digital images, the compression parameters can include a bitmap resolution or a compression quality parameter. The storage size estimate can be accurate. Thus the estimated storage size can have a small error relative to the actual compressed storage size. For example, an estimation error can be less than about fifteen percents of the actual compressed storage size, or less than about ten percents or even less than about five percents of the actual compressed storage size. The estimate can take into account whether or not the Huffman encoding changes when an image is compressed. The estimate of the storage size can also take into account the lengths of code values used by the Huffman encoding for representation markers, such as end-of-block ("EOB") markers.

A storage size can be estimated in a fast and efficient way for an image set including a large number of images. The image set can include images to be attached to an electronic mail, or images to be stored in a device such as a disk or a digital camera that has limited storage space. Compression parameters can be automatically determined to match a global constraint, such as a maximum storage size for the entire image set. Thus a user does not have to guess parameter values to match the global constraint. A reliable estimate can be quickly obtained for the entire image set based on storage size estimates for only a few selected images in the set. The storage size estimate may have a small error for the entire set if the estimate is based on storage sizes of the largest images in the set. Thus the storage size estimate addresses the storage size for the entire image set, instead of calculating individual estimates for each image in the set. Compression parameters can be determined to optimize visual quality for the images after the compression.

In a graphical interface, storage sizes can be graphically presented for multiple images by graphics objects, where each graphics object includes a corresponding image and has a linear size that is proportional to the storage size of the image. In such graphical representations, a user can easily identify which of the multiple images use large or small storage space. Thus the user can easily select oversized images that need to be compressed, and decide how much the selected images should be compressed. Such graphical representations can also be used to present storage size estimates to a user. By presenting storage size estimates, the graphical representation can provide a visual feedback of whether a particular compression achieves a desired goal, such as a maximum storage size or a uniform distribution of storage sizes for different images. Based on the separate graphical representations for the storage sizes of the images in the set, the user can easily identify the images that have large storage sizes. To match a maximum storage size constraint for sending an image set, the user can effectively reduce the storage size set by removing from the set the images that have large storages sizes. The removed images can be sent separately from the reduced set.

The details of one or more implementations of the invention are set forth in the accompanying drawings and the description below. Other features and advantages of the invention will become apparent from the description, the drawings, and the claims.

BRIEF DESCRIPTION OF THE DRAWINGS

FIGS. 2, 4, 6, 8-11 and 13-16 are schematic flow diagrams illustrating methods for storage size estimation.

FIGS. 3A-3E are schematic diagrams illustrating exemplary JPEG representations.

Like reference numbers and designations in the various drawings indicate like elements.

DETAILED DESCRIPTION

Figure 1:
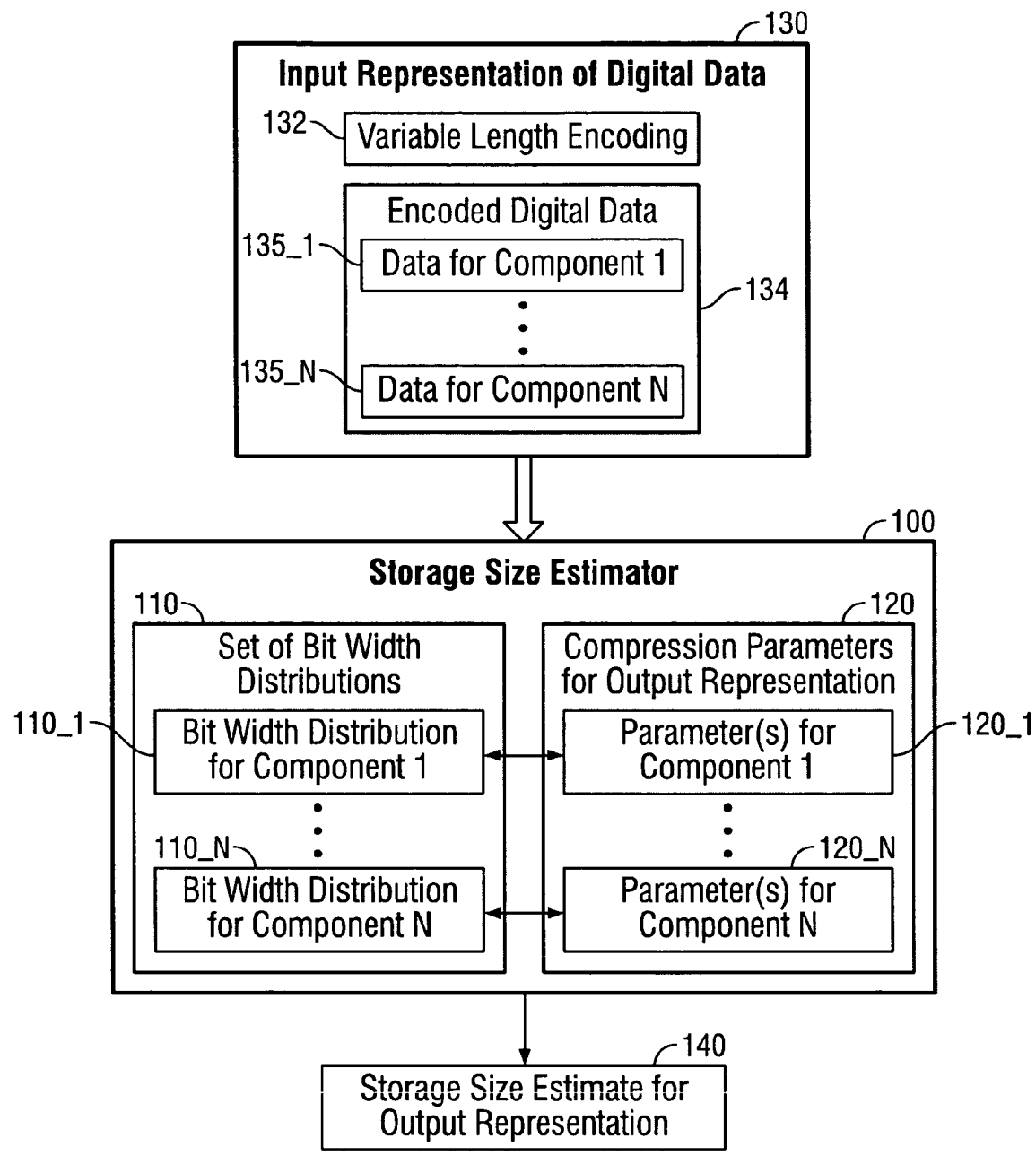
FIG. 1 is a schematic diagram illustrating a storage size estimator that uses bit width distributions.

FIG. 1 illustrates a storage size estimator 100. The storage size estimator 100 receives an input representation 130 of digital data, and predicts a storage size estimate 140 that is an approximate storage size for an output representation of the digital data. The storage size is defined based on the number of bits used in the output representation to represent the digital data. The storage size is defined independent of whether the output representation is actually stored or not in a storage device. For example, the storage size can explicitly specify the total number of bits, or based on the total number of bits, the storage size can specify a transmission time for a particular transmission speed. Alternatively, the storage size can be any other function of the total number of bits.

The input representation 130 and the output representation use variable length encodings to represent the digital data. The output representation can use the same or a different encoding than the input representation 130. In one implementation, the input representation 130 is a first JPEG representation of a digital image, and the storage size estimator 100 predicts the storage size estimate 140 for a second, typically more compressed JPEG representation of the same image. The storage size estimate 140 can be presented to a user or further processed. For example, the storage size estimate 140 can be used to determine compression parameters for the digital image itself or for images in an image set that includes the digital image.

The storage size estimator 100 can be implemented in one or more software applications or as a plug-in to a software application. The storage size estimator 100 can also be implemented in hardware of electronic devices, such as image capturing or displaying devices. For example, the storage size estimator 100 can be implemented in digital cameras, CCD devices, scanners, or portable devices such as personal digital assistants or mobile phones. For portable devices, the storage size estimator 100 or portions of it can be implemented on a remote server.

The input representation 130 specifies a variable length encoding 132 and digital data 134 that is encoded based on the variable length encoding 132. The variable length encoding 132 associates code values to respective data values. The code values can have different lengths for different data values. In one implementation, the variable length encoding 132 includes a bit-width encoding in which each code value includes only the "valuable" bits of the standard binary numbers. That is, the code value has a length defined by the highest location of 1 in the standard form of binary numbers. Thus the number 0 has zero length, the number 1 has a length of one bit, the numbers 2 and 3 (binary 10 and 11) have a length of two bits and the numbers 4-7 (binary 100-111) have a length of three bits, etc. Instead of using a fixed number of bits, such as an entire byte which includes eight bits, to represent a value of five (00000101) or a value of three (00000011), these values are represented only by the last three (101) or two (11) bits, respectively. The number of valuable bits is referred to as the bit width of the data value.

The encoding 132 can also include a Huffman encoding specified by a Huffman code table. In Huffman encoding, code values having small lengths are associated with data values that have a high frequency of occurrence in the digital data 134, and code values having large lengths are associated with data values that have a low frequency of occurrence in the digital data 134. Instead of the bit-width or the Huffman encoding, the variable length encoding 132 can include any other variable length encoding that is specified implicitly or explicitly for the input representation 130.

The encoded digital data 134 includes encoded data values for multiple representation components 135_1-135_N. The representation components 135_1-135_N are components that are separately addressed in the input representation 130. Thus the representation components 135_1-135_N can be identified and separately manipulated in the input representation 130. For example, data values can be differently encoded or quantized in different representation components. Or data values can be combined according to predetermined rules from different representation components 135_1-135_N to determine content represented by the digital data 134.

In one implementation, the digital data 134 includes encoded data values of a JPEG representation of a digital image, and the representation components 135_1-135_N represent frequency components of a discrete cosine transformation ("DCT") that is applied to sub-arrays in a pixel array of the image. In the JPEG representation, data values for different DCT frequency components can be identified and separately manipulated. For example, low frequency DCT components can be quantized by smaller quantizors than those for high frequency components. Or a component for zero DCT frequency (also called a "DC component") can be encoded differently from components for non-zero DCT frequencies (also called "AC components"). An exemplary JPEG representation is discussed below with reference to FIGS. 3A-3E.

The storage size estimator 100 generates the storage size estimate 140 based on compression parameters 120 for the output representation and bit width distributions in a distribution set 110. The bit width refers to the number of valuable bits in a data value. Each bit width distribution is a function that, for each bit width that is available in a particular representation, specifies a frequency of occurrence of the data values that have that bit width.

The storage size estimator 100 generates the bit width distributions in the set 110 based on the data values represented in the encoded data 134 of the input representation 130. The distribution set 110 includes N separate bit width distributions 110_1-110_N. Each of the bit-width distributions 110_1-110_N is generated based on data values in a corresponding subset of the encoded data 134. Each subset includes encoded data for one or more representation components of the input representation 130. Because the representation components are addressable in the input representation 130, the storage size estimator 100 can identify data values for each representation component and, based on the identified data values, generate the corresponding bit-width distribution in the set 110. Generating bit width distributions is further discussed with reference to FIG. 4.

The compression parameters 120 are parameters for compressing digital data into the output representation. The compression parameters 120 can be received directly or can be derived from global parameters. For example, a user can provide a global compression quality parameter or a maximum storage size, and the compression parameters 120 can be determined by the storage size estimator 100 based on the global parameters. For compressing a digital image, the compression parameters 120 can specify resolutions for pixel arrays of different content channels, such as Y, U and V channels in a JPEG representation, or quantizors for quantizing data values, such as amplitude values of DCT frequency components of the JPEG representation. Compression parameters for JPEG representations are further discussed with reference to FIGS. 3A-3E.

The compression parameters 120 include parameter sets 120_1-120_N. Each of the parameter sets 120_1-120_N specifies compression parameters for a corresponding component in the output representation. For each of these components in the output representation, the storage size estimator 100 generates a corresponding bit width distribution in the set 110. In the implementation shown in FIG. 1, the parameters 120 specify compression parameters for representation components that have a one-to-one correspondence with the components 135_1-135_N in the input representation 130. Thus for each representation components $135\_i$ (i=1,...,N), the distribution set 110 includes a corresponding bit width distribution $110\_i$, and the compression parameters 120 include a corresponding parameter set $120\_i$. If the compression parameters 120 specify parameter sets only for selected components in the output representation, bit width distributions can be specified only for the selected components.

In alternative implementations, the output representation can include representation components that are different from the representation components 135_1-135_N in the input representation 130. For example, the output representation can have a combined component that includes data from two or more of the representation components 135_1-135_N. For the combined component, a corresponding parameter set can be specified in the compression parameters 120, and a corresponding bit width distribution can be determined for the distribution set 110.

FIG. 2 illustrates a method 200 that can be performed by a system that includes the storage size estimator 100 (FIG. 1) to predict a storage size for a compressed representation of digital data. In one implementation, the digital data includes a digital image, and the system predicts storage sizes for an output JPEG representation of the digital image.

The system receives digital data in an input representation that uses variable length encoding (step 210). That is, data values are represented in the input representation by code values that have different lengths. The input representation can include data values for one or more representation components. For a digital image in an input JPEG representation, the representation components include DCT frequency components. For each component, the data values can be encoded using a bit-width, Huffman or any other variable length encoding.

In alternative implementations, the digital data can be received in any representation, and the system can determine the code values for the input representation from the received digital data. For example, the system can generate the input representation from the received data, and identify the code values in the input representation. Or the code values can be determined "on the fly" without actually generating the input representation or portions of it.

Based on the bit widths of the data values in the input representation, the system determines bit width distributions for one or more representation components in an output representation (step 220). In the output representation, data values are encoded using a variable length encoding that includes a bit-width encoding or a Huffman encoding. The variable length encoding in the output representation can be the same or a different encoding than that in the input representation. The system can determine respective bit width distributions for all components, or only a selected set of the components in the output representation. For example, bit width distributions can be determined only for those components that would be differently compressed in the output representation than in the input representation. The components that are differently compressed can be identified from the compression parameters.

In the output representation, the components can correspond one-to-one to representation components in the input representation. For a digital image, the input representation can be an input JPEG representation, and the output representation can be an output JPEG representation that is more compressed than the input JPEG representation. If the input and output JPEG representations specify the same DCT frequency components, a respective bit width distribution can be determined for each of these DCT frequency components. Alternatively, one or more components of the output representation can be a combined component that corresponds to multiple components in the input representation.

For each output representation component, the system determines a corresponding bit width distribution based on the input representation. If the output component corresponds to a single component in the input representation, the bit width distribution can be determined based upon bit widths of data values for that single component in the input representation. If the output component corresponds to multiple components in the input representation, the bit width distribution can be determined based upon bit widths of data values for the multiple components in the input representation.

Each bit width distribution is generated by identifying bit widths of data values for the corresponding component or components in the input representation, as further discussed with reference to FIG. 4. Alternatively, the input representation may include metadata that explicitly specifies bit width distributions for one or more components in the input representation. Such metadata can be generated by a system that uses bit width distributions, such as a system that includes the storage size estimator 100 (FIG. 1). The metadata can specify the distributions by tables or statistical data that the system can analyze. If the output component is a combination of multiple input components, the system can determine the bit width distribution for the output component by an appropriate combination of the bit width distributions for the multiple input components.

The system estimates a storage size of the output representation of the digital data based on the bit width distributions and compression parameters specified for the output components (step 230). In one implementation, the system modifies the bit width distributions based on the compression parameters for the output components, and estimates the storage size of each output component in the output representation based on the corresponding modified distribution. The system can estimate the storage size for the entire output representation from the storage size estimates for the components. Estimating the storage size based on bit width distributions is further discussed with reference to FIGS. 6-9.

FIGS. 3A-3E illustrate exemplary JPEG representations of a digital image. The exemplary JPEG representations use a variable length encoding that includes a bit-width encoding and a Huffman encoding. The exemplary JPEG representations can be either input or output representations for the storage size estimator 100 (FIG. 1). That is, the storage size estimator 100 can predict approximate storage sizes either based on or for the exemplary JPEG representations.

FIG. 3A illustrates a JPEG generator 320 that receives a bitmap 310 of a digital image and generates a JPEG representation 330 of the received image. In the bitmap 310, the received image is defined by an input pixel array having an input resolution, such as 1200 pixels by 1600 pixels. Each input pixel specifies red, green and blue ("RGB") color values in an RGB color space. Alternatively, the input pixels can specify color values in another color space, such as a cyan-magenta-yellow-black ("CMYK") or a hue-saturation-luminance ("HSL") color space. For each input pixel, the bitmap 310 uses a predetermined number of bits to represent the corresponding color values.

The JPEG generator 320 specifies a data transformation 322, a quantization 324 and a variable length encoding 326. First, the JPEG generator 320 applies the data transformation 322 to transform the received digital image into a particular format. Next, data values are quantized according to the quantization 324, and the quantized data values are encoded according to the variable length encoding 326. In one implementation, the variable length encoding 326 includes a bit-width encoding and a Huffman encoding. The encoded data values are used to generate the JPEG representation 330. Optionally, the generated JPEG representation 330 can also include metadata to identify the transformation 322, the quantization 324 or the encoding 326.

FIG. 3B illustrates a data transformation 340 that is an exemplary implementation of the data transformation 322 (FIG. 3A), which specifies the transformation of the received image into a particular format. The data transformation 340 specifies a color transformation 342, a downsampling 344 and a DCT transformation 346. The color transformation 342 transforms color values specified by the pixels in the received image into a target color space, such as a YUV color space or another color space that separates luminance (Y) and chrominance (U and V). The color transformation 342 is separately applied for each pixel in the received image.

For each component of the target color space, the data transformation 340 defines a respective content channel and a corresponding pixel array. Thus for the YUV color space, a luminance channel Y and two chrominance channels U and V are defined. In the pixel array of each channel, the pixels specify values only for the single color component that is represented by that channel. Thus luminance values are defined by pixels in the array of the luminance channel Y, and chrominance values are defined for the U and V components by pixels in the arrays of the channels U and V, respectively. In each of the content channels, the corresponding array is first defined to have the same resolution as the pixel array of the received image.

The downsampling 344 is an optional transformation that can be used to decrease the storage size of the JPEG representation 330. The downsampling 344 is applied to reduce the resolution of the pixel arrays in one or more of the content channels. Decreasing the resolution in a channel causes information loss from the content represented by that channel. Because the human eye is more sensitive to luminance than to chrominance, the downsampling 344 decreases the resolution only in the chrominance channels U and V without altering the resolution in the luminance channel Y. Thus the information loss caused by the downsampling is less visible to the human eye. For most images, the downsampling 344 may decrease the resolution by a factor of two or four in the chrominance channels without substantial degradation to visual quality of the image.

The DCT transformation 346 is applied in each content channel to sub-arrays of pixels, such as sub-arrays of eight-by-eight pixels. In each sub-array, the pixel values are transformed into amplitude values of the DCT frequency components. Thus the transformation generates amplitude values for sixty-four separate DCT frequency components that can be labeled by a composite index (FX, FY) specifying a horizontal frequency FX and a vertical frequency FY. With this or some other labeling, the different DCT frequency components are addressable and can be used as representation components in the JPEG representation 330.

Figures 3C, 3D:
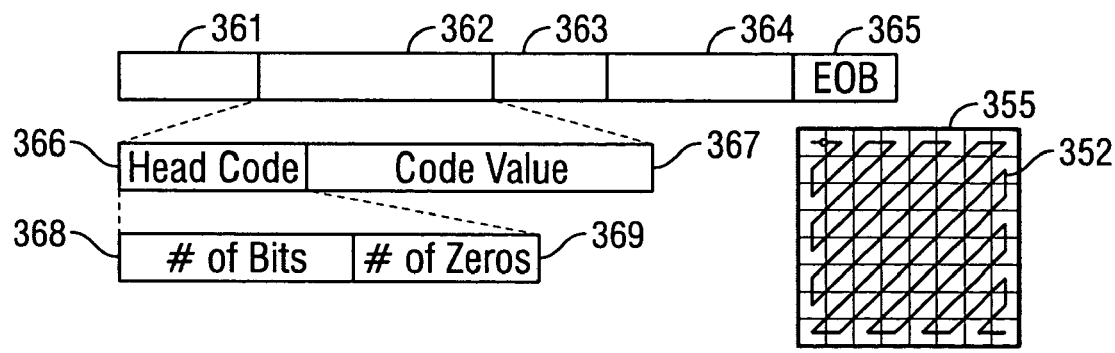

FIG. 3C illustrates an exemplary quantizor table 350 that can be used to quantize the amplitude values for the different DCT frequency components of the eight-by-eight sub-arrays. The same quantizor table 350 can be used for each content channel, or different quantizor tables can be defined for different content channels. For example, luminance and chrominance channels can have different quantizor tables.

The quantizor table 350 specifies a corresponding quantizor for each of the DCT frequency components that are labeled by horizontal frequencies X0-X7 and vertical frequencies Y0-Y7. Both the horizontal and vertical frequencies are ordered according to increasing frequency values in the table 350. Thus the DCT frequency component (X0,Y0) is the DC component which has the smallest frequency value (which is zero) both horizontally and vertically, and the component (X7,Y7) is an AC component that has the highest horizontal and vertical frequencies.

For the DC component (X0,Y0), the quantizor table 350 specifies a small quantizor, which is 2 in the example. After applying the quantizor of 2, an integer multiple of 2 will separate different amplitude values for the frequency component (X0,Y0). As the horizontal or the vertical frequency increases, the table 350 specifies progressively larger quantizors. For the AC component (X7,Y7), the quantizor table 350 specifies the largest quantizor, which is 12 in the example. Thus after the quantization, an integer multiple of 12 will separate different amplitude values for the frequency component (X7,Y7).

In one implementation, quantized amplitude values are generated by dividing each amplitude value with the corresponding quantizor, and keeping only the integer part from the result of the division. Thus zero quantized amplitude is obtained for any amplitude value that is smaller than the corresponding quantizor. Often, the amplitude values are small and the quantizors are large for high horizontal or vertical DCT frequencies. Thus for most of the high frequencies, the quantized amplitudes become zero.

The larger the quantizor, the more information may be lost when it is applied. For example, two values that differ by 4 will remain different after quantization by 2, but may have the same quantized value after quantization by 12. Thus the information loss can be controlled for the JPEG representation by selecting appropriate quantizors. For example, each quantizors in the table 350 can be increased according to a predetermined function as a global compression quality parameter decreases.

FIG. 3D illustrates an exemplary data block 360 in the JPEG representation 330 (FIG. 3A). The data block 360 represents quantized amplitude values for an ordered sequence of the DCT frequency components. The block 360 can include data for all DCT frequency components or only for a subset of the DCT frequencies, such as DCT frequencies corresponding to a single horizontal frequency or a single vertical frequency.

In one implementation, the data block 360 represents amplitude values for all sixty-four DCT frequency components of an eight-by-eight sub-array. In the data block 360, the DCT frequencies are ordered according to an ordering path. An exemplary "zigzag" ordering path 352 is illustrated in a table 355, where the horizontal and vertical DCT frequencies are arranged the same way as in the table 350. Thus the ordering path 352 is such that the lowest DCT frequencies are near the beginning of the ordering path 352, and the highest DCT frequencies are near the end of the ordering path 352.

The data block 360 includes data elements 361-364 and an EOB marker 365 indicating the end of the block 360. The EOB marker 365 is used to close the data block 360 after the last DCT frequency that has non-zero quantized amplitude. Because quantized amplitude values are often zero for large DCT frequencies, which are near the end of the ordering path, using the EOB marker 365 can decrease the storage size of the JPEG representation.

Each of the data elements 361-364 represents quantized amplitude values for one or more DCT frequency components, and includes exactly one non-zero quantized amplitude value for a particular DCT frequency. In addition to the non-zero amplitude, each data element can also represent one or more DCT frequencies that have zero amplitude values and precede (alternatively, follow) the particular frequency according to the ordering of the DCT frequencies.

As illustrated for the data element 362, each data element includes a code head 366 and a code value 367. The code value 367 represents the non-zero quantized amplitude value of the data element 362 according to a bit-width encoding that uses only the valuable bits of the non-zero amplitude value. Thus the code value 367 uses a number of bits that depends upon the represented quantized amplitude value.

The code head 366 identifies which bits are used by the code value 367. The bits of the code value 367 follow the code head 366 that specifies a bit length 368 to identify the number of bits for the code value 367. The code head 366 also specifies a zero run 369 to identify DCT components that have zero amplitude values and immediately precede (alternatively, follow) the DCT frequency of the code value 367 in the order of the DCT frequencies. Thus the DCT frequency component that has non-zero amplitude value represented by the data element 362 can be identified based on the zero run 369 and the order of the DCT frequencies.

In one implementation, the code head 366 is Huffman encoded. The Huffman encoding is based on a relative number of occurrences of the different values for the code head. The larger the number of occurrences of a particular head value, the shorter the code value representing that head value.

Optionally, the Huffman encoding can be applied not only to the code heads, but also to other elements of the data block 360, such as the EOB marker 365. Thus the Huffman encoding will also depend on the relative frequency of occurrence of the EOB markers. For a high quality JPEG representation in which most quantized amplitude values are non-zero even for large DCT frequencies, the data blocks 360 are typically long and the relative occurrence of the EOB markers is small. Accordingly, the EOB marker's Huffman code will include many bits. In a highly compressed JPEG representation, however, quantized amplitude values are non-zero only for the smallest DCT frequencies, and the data blocks 360 are typically short. Thus the EOB marker has a large relative frequency of occurrence, and its Huffman code will include only a few bits.

Figure 3E:
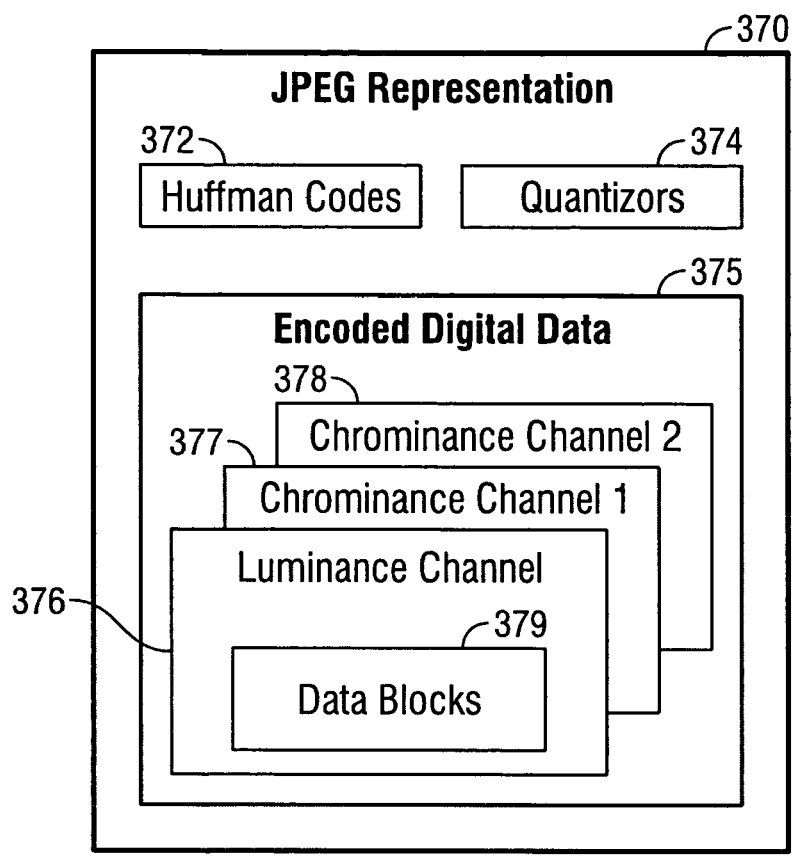

FIG. 3E illustrates an exemplary JPEG representation 370 of a digital image. The JPEG representation can be generated by the JPEG generator 320 (FIG. 3A), and includes Huffman codes 372, quantizors 374 and encoded digital data 375. The JPEG representation 370 can be implemented in a single or multiple files. For example, the encoded digital data 375 can be included in a first file that includes only references, such as names or pointers, to identify one or more separate files in which the Huffman codes 372 and the quantizors 374 are specified.

The encoded digital data 375 includes data for a luminance channel 376 and two chrominance channels 377 and 378. In each channel, the data values are represented by data blocks 379, where each data block corresponds to an eight-by-eight sub-array in the pixel array of the channel. Each of the data blocks 379 has a structure similar to that of the block 360 (FIG. 3D), which represents encoded quantized amplitude values for all sixty-four DCT frequency components.

The Huffman codes 372 specify the relation between the code values in the data blocks and the corresponding values of the code heads. The Huffman codes 372 can be defined by one or more Huffman tables, where each Huffman table defines a corresponding Huffman encoding. For example, separate Huffman encodings can be defined for luminance and chrominance channels. Based on the Huffman codes 372, the code heads can be identified and decoded in each of the data blocks 379. The decoded head values identify corresponding bit lengths and zero runs. The identified bit length specifies which bits represent the non-zero amplitude value for a particular DCT frequency, and the identified zero run specifies the number of DCT frequencies that have a zero quantized amplitude value and immediately precede (alternatively, follow) the particular DCT frequency.

The quantizors 374 specify the quantizor values that have been used to quantize the amplitude values of different DCT frequencies. The quantizors 374 can include one or more quantizor tables, such as the quantizor table 350 (FIG. 3C). For example, separate quantizor tables can be specified for luminance and chrominance channels.

The Huffman codes 372 and the quantizors 374 can be used to uncompress the encoded digital data 375. First, the Huffman codes 372 are used to identify and decode the code heads. Based on the bit lengths and zero runs in decoded code heads, the quantized amplitude values are identified for each DCT frequency component in each eight-by-eight sub-array. Next, the quantizors 374 are used to "stretch" out the quantized amplitude values. For example, each quantized amplitude value is multiplied by the corresponding quantizor. To present the uncompressed image in a representation similar to the bitmap representation 310, the inverse of the data transformation 322 can be applied to the "stretched" amplitude values.

Figure 4:
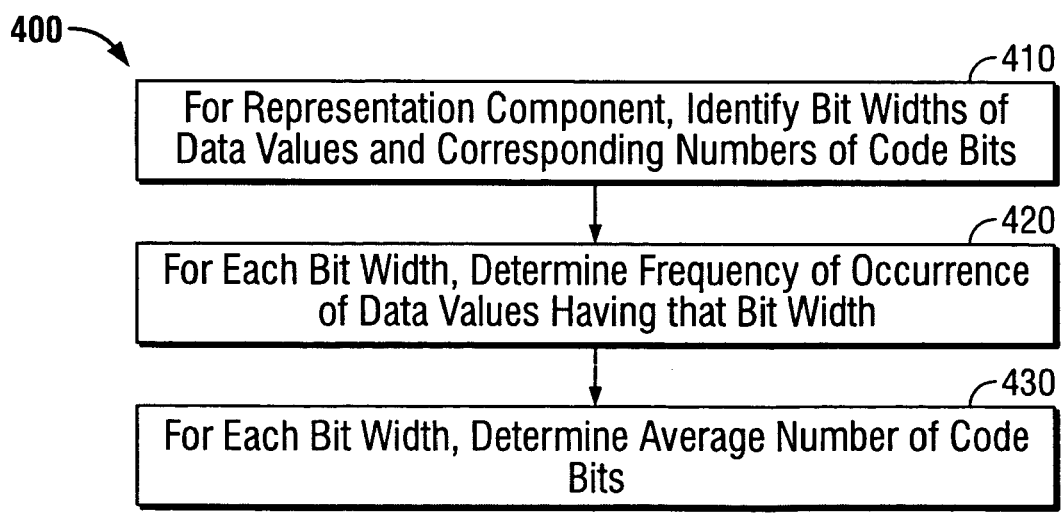

FIG. 4 illustrates a method 400 to determine bit width distributions and average numbers of code bits for predicting storage size for compressed representations that use variable length encoding. The method 400 can be performed by a system including the storage size estimator 100 (FIG. 1). The system predicts the storage size based on an input representation that specifies one or more representation components. For example, the input representation is a JPEG representation that specifies DCT frequency components for a digital image.

For a particular representation component, the system identifies bit widths of data values and corresponding numbers of code bits in the input representation (step 410). To identify the bit widths of the data values in a JPEG representation, the system identifies code values that represent non-zero quantized amplitudes for corresponding DCT frequencies. The respective bit widths are defined by the valuable bits of the quantized non-zero amplitudes. In the JPEG representation, the bit width is explicitly specified for the respective non-zero quantized amplitude in the corresponding head code 366 by the bit length 369 (FIG. 3D).

To determine the number of code bits, the system identifies encoded data values that represent data for the particular representation component. For each identified data value, the system determines the number of code bits that are used in the input representation for the encoded data value.

For the exemplary data block 360 (FIG. 3D), the system identifies the data elements 361-364, and for each element, the corresponding code value 367 and the DCT frequency for which the code value 367 specifies a non-zero amplitude. For the identified DCT frequency, the number of code bits is defined to include the number of bits that are used by the code value 367 itself, and optionally, one or more bits of the code head 366. For example, the bits specifying the bit length 368 of the code value 367 can be included in or excluded from the number of code bits for the DCT frequency of the code value 367.

The code head 366 also specifies the zero run 369, which defines the number of preceding DCT frequencies having zero amplitude. For these zero-amplitude DCT frequency components, the system can evenly distribute the number of bits representing the zero run 369. In alternative implementations, the code bits of the entire code head 366 can be associated with the code value 367, and the zero-amplitude DCT frequency components can be defined to have zero code bits. The system can also separately estimate a storage size for metadata, such as the code heads 366, EOB markers 365 or other Huffman encoded markers. In such implementations, the system assigns the number of bits of the code value 367 exclusively to the non-zero amplitude DCT frequency, and assigns zero code bits to the DCT frequency components having zero amplitudes.

For each bit width, the system determines frequencies of occurrence for data values having that bit width (step 420). A frequency of occurrence specifies a number of data values that have the corresponding bit width. In one implementation, each frequency of occurrence is calculated based on data values for a particular representation component in a particular content channel. In a JPEG representation, a respective frequency of occurrence is determined for each bit width, each DCT component and each of the luminance and chrominance channels. In a numeric example, 16 different bit widths $(0, \ldots, 15)$ are allowed for quantized amplitude values of each of 64 DCT components in each of the 3 channels, a total of $(16 \times 64 \times 3 =)$ 3072 frequencies of occurrences are determined. In an alternative representation, a single frequency of occurrence can be defined for each bit width and each representation component based on data values for all content channels. For the above numeric example, the alternative implementation defines $(16 \times 64 =)$ 1024 separate frequencies of occurrence.

To determine frequencies of occurrence for a particular representation component in a particular channel, the system defines a first table including a respective count number for each bit width ("w_i", i=1, ..., M) that is available to represent data values in a compressed representation. The count numbers in the first table have preset values, such as zeros. Each time a bit width of a data value is determined, the count number corresponding to that bit width in the first table is updated, that is, incremented by one. After updating the first table based on the bit widths of all the data values for the particular component in the particular channel, the count numbers in the first table specify the respective frequency of occurrence ("FO_i") for each bit width w_i. Thus the first table specifies a bit width distribution for the particular representation component in the particular channel.

For each bit width of the data values for each representation component in each channel, the system determines a corresponding average number of code bits (step 430). Each average number of code bits specifies the number of bits used on average by data values that have a particular bit width and represent data for a particular representation component in a particular content channel. For the above numeric example, 3072 separate average numbers of code bits are determined. If a single average number of code bits is defined for each bit width and each representation component based on data values for all content channels, only 1024 separate average numbers of code bits is required in the numeric example.

To determine the average numbers of code bits ("ACB_i") for a particular representation component in a particular channel, the system defines a second table including a respective count number for each available bit width w_i. The count numbers in the second table have preset values, such as zeros. Each time the system determines a number of code bits for a data value for the particular representation component in the particular channel, the system updates the count number corresponding in the second table to the bit width of the data value. The update increments the count number by the number of code bits determined for the data value. After updating the second table based on the data values for the particular representation component in the particular channel, the count numbers in the second table specify respective numbers of code bits ("CB_i") used for the bit widths w_i.

For each bit width w_i, the average number of code bits ACB_i can be determined by dividing the corresponding number of code bits CB_i with the frequency of occurrence FO_i for the bit width w_i, as $$ACB\_i = CB\_i / FO\_i \quad i=1, \ldots, M. \tag{Eq. 1}$$

Without addressing different bit widths separately, a total number of code bits (TNCB) represents the content in the data values for the particular representation component in the particular channel. Thus the total number of code bits TNCB specifies a storage size for the content in the particular representation component in the particular channel. The total number of code bits TNCB can be determined by summing up the number of code bits CB_i for all available bit widths w_i as $$TNCB = \Sigma_i CB\_i = \Sigma_i ACB\_i FO\_i \quad i=1, \ldots, M. \tag{Eq. 2}$$

In Eq. 2, the second equality is based on Eq. 1 and determines the total number of code bits TNCB from the average number of code bits ACB_i and the frequency of occurrence FO_i for all available bit widths.

By using the method 400, an arbitrarily large JPEG representation can be characterized by a few thousand numbers that specify frequencies of occurrence and average numbers of bits for all available bit widths, representation components and content channels.

Figure 5:
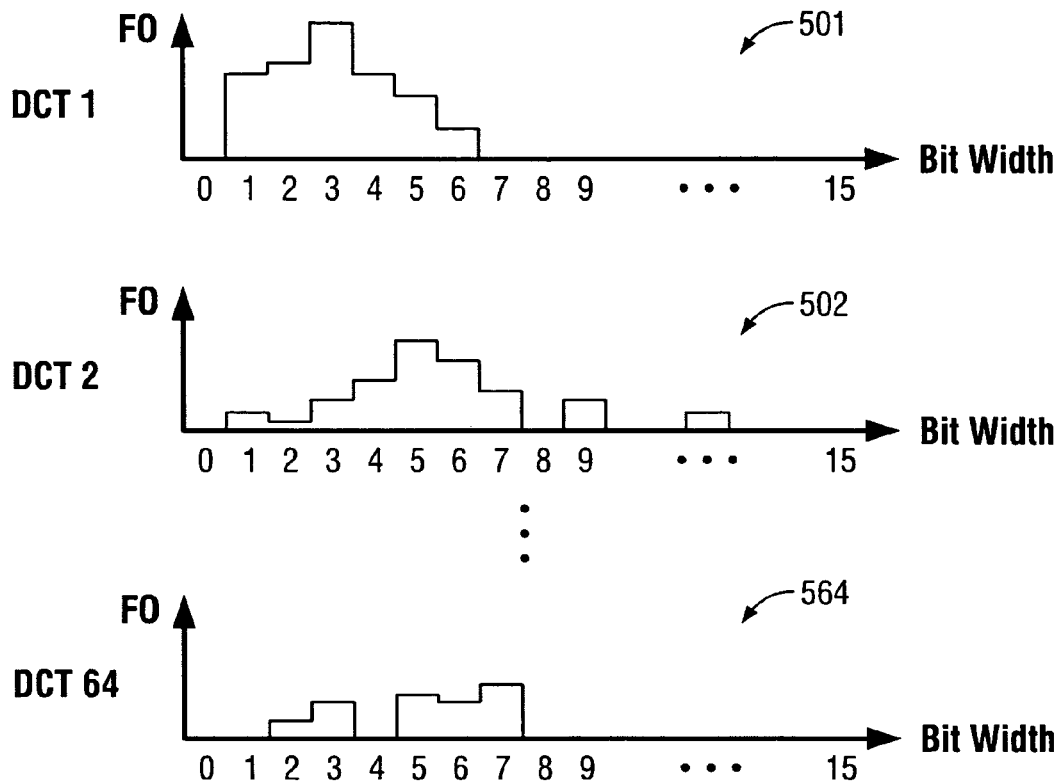
FIG. 5 is a schematic diagram illustrating exemplary bit width distributions.

FIG. 5 illustrates exemplary bit width distributions 501, 502 and 564, corresponding to a first, second and $64^{th}$ DCT components for a particular content channel in an input JPEG representation that uses zero to fifteen bits to represent each quantized DCT amplitude. For each of the distributions 501, 502 and 564, the different bit widths are represented on a horizontal axis and frequencies of occurrence ("FO") are illustrated by a corresponding histogram. For each bit width, the vertical dimension of the histogram is proportional to the frequency of occurrence for that bit width. For example, the bit width distribution 501 illustrates that most of the first DCT component's amplitude values have a bit width of three bits, and no amplitude values have bit widths that are larger than six bits.

If the zero amplitude values are defined to be represented by zero bits, the zero bit-width has no contribution to the storage size. Thus the zero bit-width element can be omitted or arbitrarily defined in each of the bit width distributions 501-564. For example, the zero bit-width element can be defined to have zero frequency of occurrence, as illustrated for the exemplary distributions 501-564. Alternatively, one or more of the zero bit-width elements can be used to store other data such as a count of EOB or other markers, such as markers indicating a predetermined number of consecutive zeros, for example 16 consecutive zeros.

Figure 6:
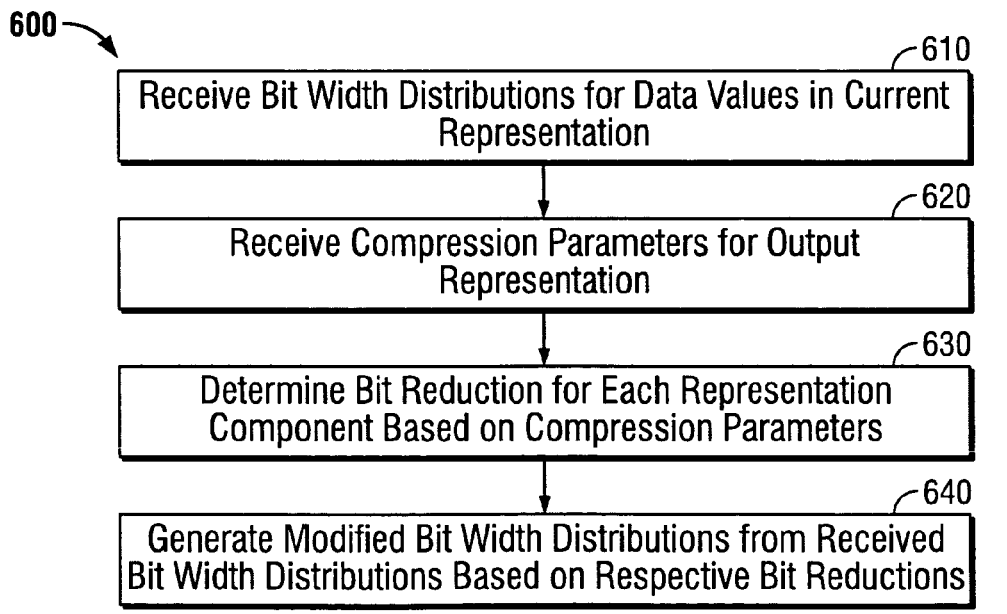

FIG. 6 illustrates a method 600 for modifying a bit width distribution to predict a storage size of an output representation that uses variable length encoding and is characterized by particular output compression parameters. The method 600 can be performed by a system including the storage size estimator 100 (FIG. 1).

The system receives bit width distributions of data values in an input representation (step 610). Each of the received bit width distributions corresponds to a respective representation component. If the input representation is a JPEG representation including multiple DCT components for a digital image, the system can receive a respective bit width distribution for each of the DCT components.

The system receives compression parameters for an output representation (step 620). The output representation specifies the same representation components as the input representation, but the received compression parameters specify a different data compression for the output representation than that in the input representation. For an input representation including a JPEG representation of a digital image, the output representation can include another JPEG representation for which the received compression parameters specify a different compression quality. For example, the received compression parameters can specify larger quantizors for one or more DCT components in the output JPEG representation than those in the input JPEG representation.

The system determines a bit reduction for each representation component based on the received compression parameters (step 630). The bit reduction is an average difference between the bit widths of corresponding quantized data values in the input and output representations. For a particular data value that is quantized by a larger quantizor in the output representation than in the input representation, the quantized data value will have a smaller value and a reduced bit width in the output representation. For the particular data value, the bit reduction is the difference between the original and the reduced bit widths.

The bit reduction can be predicted for arbitrary data values based on the quantizors in the input and output representations. For each representation component (j=1, ..., N), the data values are quantized with a corresponding quantizor ("QI_j") in the input representation, and the received compression parameters specify another, typically larger, quantizor ("QO_j") for the output representation. The bit reduction ("BR_j") is determined for each component by the two-based logarithm ("$\log_2$") of the ratio of the corresponding quantizors in the input and output representations. That is, $$BR\_j = \log_2(QI\_j / QO\_j) \tag{Eq. 3}.$$

If the ratio (QI_j/QO_j) is an integer power n of two (that is $2^n$), the bit reduction BR_j is the integer power n itself.

If the ratio (QI_j/QO_j) is not an integer power of two ($2^x$, where x is a non-integer number), the bit reduction BR_j=x indicates an average reduction of bit widths. For a particular data value, the bit reduction can be any of the two adjacent integer bit reductions that are closest to the non-integer bit reduction. For each of the two adjacent integer bit reductions, a weight can be determined such that on average the bit reduction corresponds to the non-integer BR_j. The weights can be defined to be independent of the original bit width, or separate weights can be determined for different original bit widths. For a particular bit width, the system assumes that all possible data values are uniformly represented in the image. Then the system divides each possible value by $2^x$ and calculates the integer bit reduction for that value. Based on the calculated integer reduction, the weight is determined for the two possible integer bit reductions. For a bit width of three, which allows four binary values (100, 101, 110 and 111), a probability of ¼ is assigned to each value. After dividing by $2^x$ each of the four values, if the bit reduction is n for three values and n+1 for a single value, the system assigns a weight of ¾ to the bit reduction n, and a weight of ¼ to the bit reduction of n+1.

The system generates modified bit width distributions from the received bit width distributions based on the respective bit reductions (step 640). That is, each received bit width distribution corresponds to a respective representation component, and is modified based on the bit reduction determined for that representation component. If the bit reduction is an integer number n, the modified distribution is generated by shifting the received bit width distribution towards smaller bit widths by the number n of bits. If zero bit width has no associated storage size, the system disregards any portion of the distribution that is shifted to zero bit width or below. Exemplary shifts of bit width distributions are discussed below with reference to FIG. 7.

If the bit reduction is not an integer number, the modified bit width distribution can be generated based on the weights of the two adjacent integer bit reductions corresponding to the non-integer bit reduction. Each bit width is reduced by both of the two integer reductions according to their respective weights. Alternatively, the received bit width distribution can be first shifted with the non-integer bit reduction. Thus the shifted distribution will specify frequencies of occurrence for non-integer bit widths from which the system can determine frequencies of occurrence for integer bit widths by an interpolation.

Figure 7:
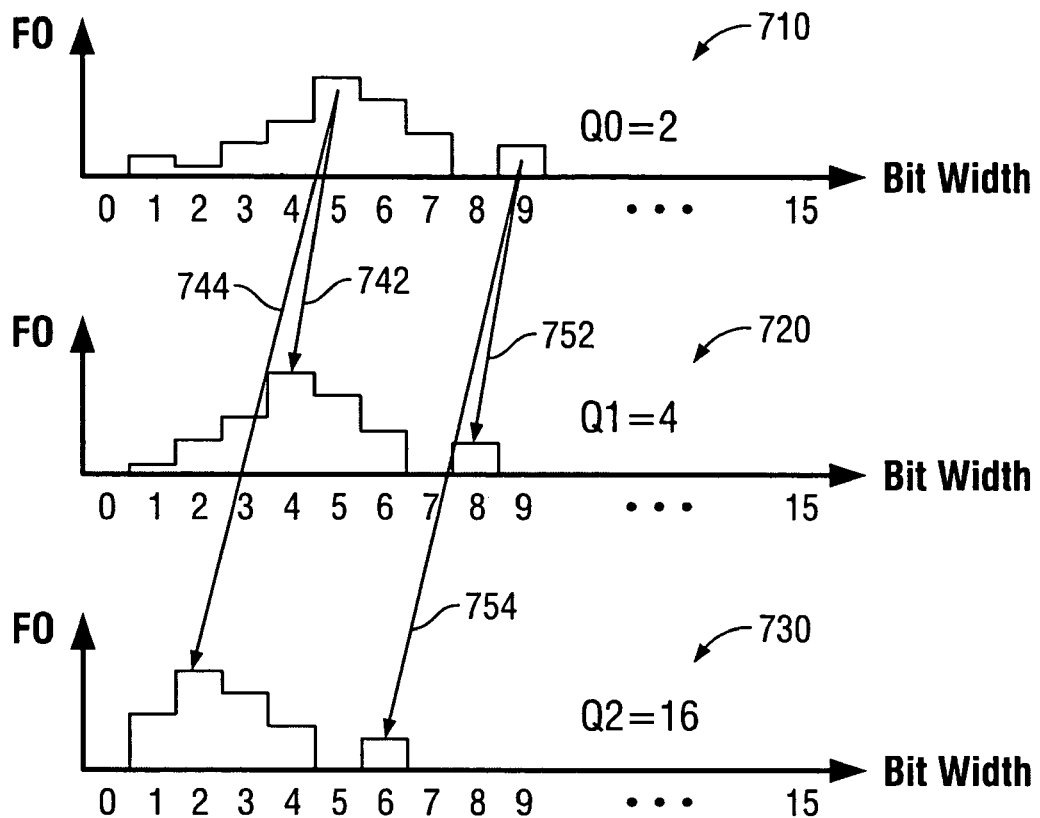
FIG. 7 is a schematic diagram illustrating modifications to exemplary bit width distributions for storage size estimation.

FIG. 7 illustrates exemplary bit width distributions 710, 720 and 730. The bit width distributions 710-730 correspond to the same DCT component in different JPEG representations that use zero to fifteen bits for each quantized DCT amplitude. For each of the distributions 710-730, the different bit widths are represented on a horizontal axis and frequencies of occurrence ("FO") are illustrated by a corresponding histogram. For each bit width, the vertical dimension of the histogram is proportional to the frequency of occurrence for that bit width.

In the example, the bit width distribution 710 corresponds to an input representation in which the amplitude values have been quantized by an input quantizor Q0=2. The bit width distributions 720 and 730 are modified bit width distributions for a first and a second output representation in which the amplitude values will be quantized by a first and a second quantizor Q1=4 and Q2=16, respectively. Thus according to Eq. 3, the bit reduction is one bit for the first output representation and three bits for the second output representation.

As illustrated for particular bit widths by the arrows 742, 744, 752 and 754, the modified distributions 720 and 730 are generated by shifting the input distribution 710 with the respective bit reductions. Thus the modified distribution 720 is generated by shifting the distribution 710 by one bit. For zero bit width, the frequency of occurrence is defined to be zero both before and after the shift. The arrow 742 illustrates the corresponding shift for the bit width of five in the distribution 710 to the bit width of four in the modified distribution 720, and the arrow 752 illustrates the shift for the bit width of nine in the distribution 710 to the bit width of eight in the modified distribution 720.

The modified distribution 730 is generated by shifting the distribution 710 by three bits. The arrow 744 illustrates the corresponding shift for the bit width of five in the distribution 710 to the bit width of two in the modified distribution 730, and the arrow 754 illustrates the shift for the bit width of nine in the distribution 710 to the bit width of six in the modified distribution 730.

Figure 8:
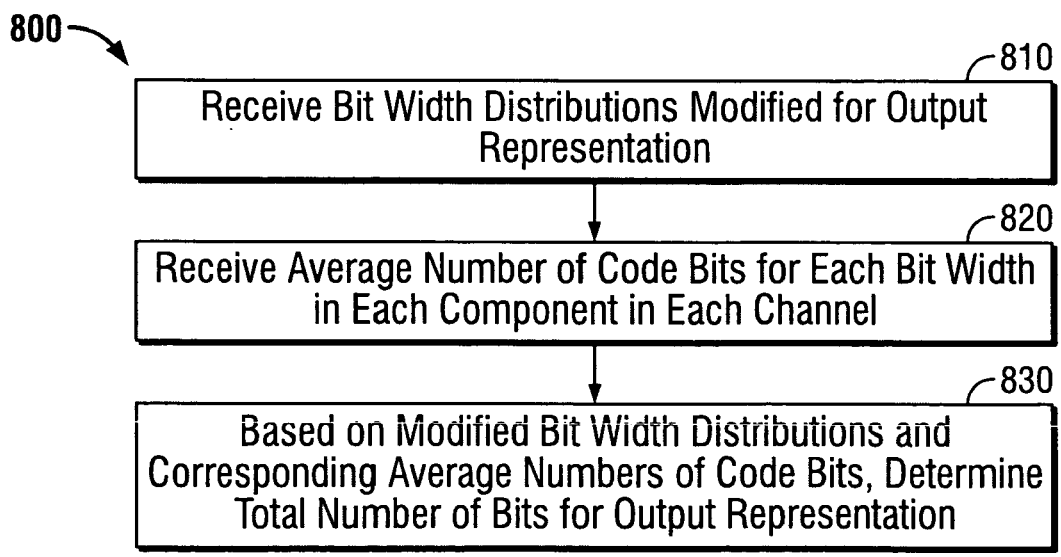

FIG. 8 illustrates a method 800 for estimating storage size of digital data in compressed representations that use variable length encoding. In one implementation, the digital data represents a digital image and the compressed representations include JPEG representations of the digital image. The method 800 can be performed by a system including the storage size estimator 100 (FIG. 1).

The system receives bit width distributions that are generated from an input representation, and are modified for an output representation (step 810). The output representation specifies multiple representation components and the received bit width distributions include a respective bit width distribution for each component. The modified bit width distribution specifies a respective frequency of occurrence (FO'_i) for each bit width w_i (i=1, ..., M) that is available for data values for the corresponding representation component. For an output JPEG representation of a digital image, the system can receive three times sixty-four bit width distributions, one for each DCT component in each content channel. The bit width distributions can be generated from an input JPEG representation and modified for the output JPEG representation, as discussed above with reference to FIGS. 6 and 7.

The system receives a respective average number of code bits for each bit width in each representation component in each channel (step 820). For a representation component in a particular channel, each average number of code bits ("ACB_i") specifies the number of bits used on average to represent data values that have the corresponding bit width w_i in that representation component of the particular channel. In one implementation, the average number of code bits is determined from the input representation, as discussed above with reference to FIG. 4. Alternatively, the average numbers of code bits can be estimated based on the encoding that is used in the output representation.

Based on the modified bit width distributions and the corresponding average number of code bits, the system determines a total number of bits for the output representation (step 830). First, a respective total number of code bits (TNCB') is determined for each representation component and each channel in the output representation. Based on the Eq. 2 above, the total number of code bits TNCB' can be determined for the particular component and channel by summing up for all available bit widths w_i the product of the average number of code bits ACB_i and the corresponding frequency of occurrence FO'_i from the modified width distribution as $$TNCB'=\Sigma_i ACB\_i FO'\_i \quad i=1,\ldots,M, \tag{Eq. 4}$$

The total number of code bits TNCB' specifies a storage size for the particular representation component in the particular channel. For the entire output representation, the total number of code bits is determined by summing the total number of code bits of all representation components in all channels. The result of the summing provides an estimated storage size for content in the output representation.

In addition to code bits used for content, the output representation may require additional storage size for metadata that specify encodings, quantizors or other information related to the output representation. If the metadata has similar structure in the output representation to that in the input representation, the total storage size can be estimated for the output representation by calculating a ratio of the total number of code bits used for content in the output and input representations, and multiplying this ratio with the total storage size of the input representation. Alternatively, the storage size estimate can be corrected according to the structural differences between the input and output representations.

According to the method 800, a storage size can be predicted for the output representation using bit width distributions and average number of code bits that characterize the data to be compressed. In one implementation, the prediction can be performed on a typical computer within a time that is less than about 50 milliseconds such as less than about ten milliseconds, for example about five milliseconds or less. Thus the prediction can be performed and the result presented in a user interface without perceivable delays to a user adjusting a compression-parameter slider.

Figure 9:
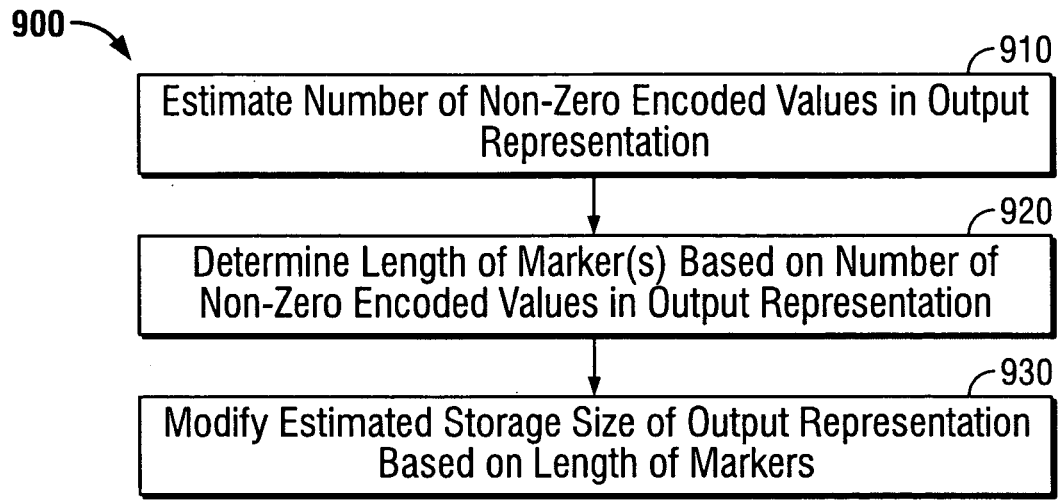

FIG. 9 illustrates a method 900 that can be performed by a system including the storage size estimator 100 (FIG. 1) to predict storage size of compressed representations using variable length encoding. The method 900 can be performed to modify a storage size estimate that is based on an input representation, where the estimate is modified to predict a storage size for an output representation in which the variable length encoding is different from that in the input representation.

In one implementation, the input and output representations are JPEG representations that use different Huffman encodings. If the output representation is substantially more compressed than the input representation, the number of non-zero DCT amplitudes is substantially smaller in the output representation than in the input representation. Thus the relative frequency of occurrence can be substantially larger for encoding markers, such EOB markers, in the output representation than in the input representation. Because Huffman encoding selects short or long codes based on relative frequencies of occurrence, a new Huffman encoding can select a shorter code for the coding markers in the output representation. For example, the EOB marker can have a length of four or five bits in the input representation and only a single bit in the output representation. In the output representation, the number of EOB markers may become a substantial fraction, such as one third or one half of the number of non-zero DCT amplitude values. Thus the change in the EOB code can substantially modify the storage size of the output representation.

To determine the storage size modification, the system estimates the number of non-zero encoded data values in the output representation (step 910). For example, the system determines bit width distributions based on the input representation, and modifies the bit width distributions for the output representation. From the modified distributions, the number of non-zero encoded data values can be estimated by summing up the frequencies of occurrence for bit widths' that represent non-zero encoded data values.

The system determines a bit length of one or more markers based on the estimated number of non-zero encoded data values in the output representation (step 920). In one implementation, the system estimates the bit length of the EOB marker for an output JPEG representation. First, the system determines the number of data blocks and the corresponding estimated number of EOB markers in the output representation. Next, a total number of output data items is calculated by adding the number of EOB markers to the estimated number of non-zero encoded data values. The system determines the length of the EOB marker based on a frequency of occurrence of the EOB marker in the output representation. The EOB's frequency of occurrence is the ratio of the number of EOB markers to the total number of the output data items.

In one implementation, the system determines that the EOB marker in the output representation has a length of:
one bit if the EOB's frequency of occurrence is larger than about one half;
two bits if the EOB's frequency of occurrence is between about one half and about one quarter;
three bits if the EOB's frequency of occurrence is between about one quarter and about one eighth; and
the same as in the input representation if the EOB's frequency of occurrence is less than about one eighth.

In alternative implementations, bit lengths can be estimated for the markers from a complete Huffman encoding that is calculated for the output representation. The complete Huffman encoding can be calculated based on bit width distributions that specify frequencies of occurrence for different bit widths in the output representations. Because the Huffman encoding depends on relative frequencies of occurrence of different data values, a complete Huffman encoding can be calculated based on the bit width distributions. Or a complete Huffman encoding can be determined based on a sample representation that is generated from selected portions of the digital data.

The system modifies the estimated storage size of the output representation based on the determined length of the markers (step 930). For example, the system can modify the estimated storage size with a storage size correction that is a product of the number of EOB markers and the difference between the length of EOB markers in the input representation and in the output representation.

Figure 10:
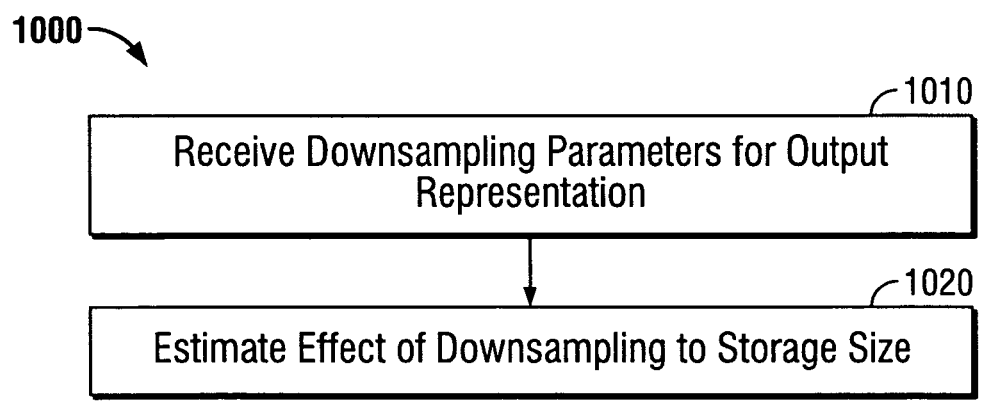

FIG. 10 illustrates a method 1000 that can be performed by a system including the storage size estimator 100 (FIG. 1) to predict a storage size of an output JPEG representation of a digital image that is received in an input JPEG representation. In alternative implementations, the method 1000 can be used to predict a storage size of an output Lempel-Zif-Welch ("LZW") representation, or a representation using Flate or another compressed format such as the fax format of the Comité Consultatif International Téléphonique et Télégraphique (CCITT). The method 1000 can be used to predict a storage size if the resolution of the image is smaller in the output representation than that in the input representation.

The system receives downsampling parameters for the output representation (step 1010). The downsampling parameters define a downsampling that is a resolution decrease of the image in the output representation. The downsampling is defined by a reduction in the dimensions of pixels arrays in one or more color channels, such as a luminance channel Y or two chrominance channels U and V in the output representation. The received downsampling parameter can specify the reduction of the array dimensions relative to the dimensions of pixel arrays in the input representation. Alternatively, explicit dimensions can be specified for the pixel arrays in the output representation.

Based on the received downsampling parameters, the system estimates the effect of the downsampling to a storage size of the output representation (step 1020). In one implementation, the image is represented in the input representation by a first rectangular pixel array having H1 rows and W1 columns, and in the output representation, by a second rectangular pixel array having H2 rows and W2 columns (H2<H1 and/or W2<W1). Thus the number of eight-by-eight sub-arrays has been reduced by a factor of (H1*W1)/(H2*W2) for the output representation.

Although the number of data blocks has been reduced, the number of non-zero DCT amplitude values typically increases in each block due to the downsampling, because downsampling produces more high DCT frequency components. Intuitively, if the image includes E well separated edges along a line in the input representation, there will be about E edges along the same line even after the downsampling. Because these edges will be closer to each other in the output representation, they can be represented by high DCT frequency components. If some of the E edges are too close to each other in the input representation in the image, the downsampling may average out these close edges. Thus for the close edges, no high DCT frequency components will be needed to represent them in the output representation.

The above effects upon the storage size can be estimated based on empirical formulas. According to one such formula, if the number of rows and the number of columns are reduced for the output representation by the same downsampling parameter R (W2=W1/R and −H2=H1/R), the number of code bits increases by a factor of about the square root of the downsampling parameter R. Because the number of blocks is reduced in the output representation by a factor of $R^2$, the system estimates that the storage size of the output representation is about $1/R^{1.5}$ times the storage size of the input representation.

Figure 11:
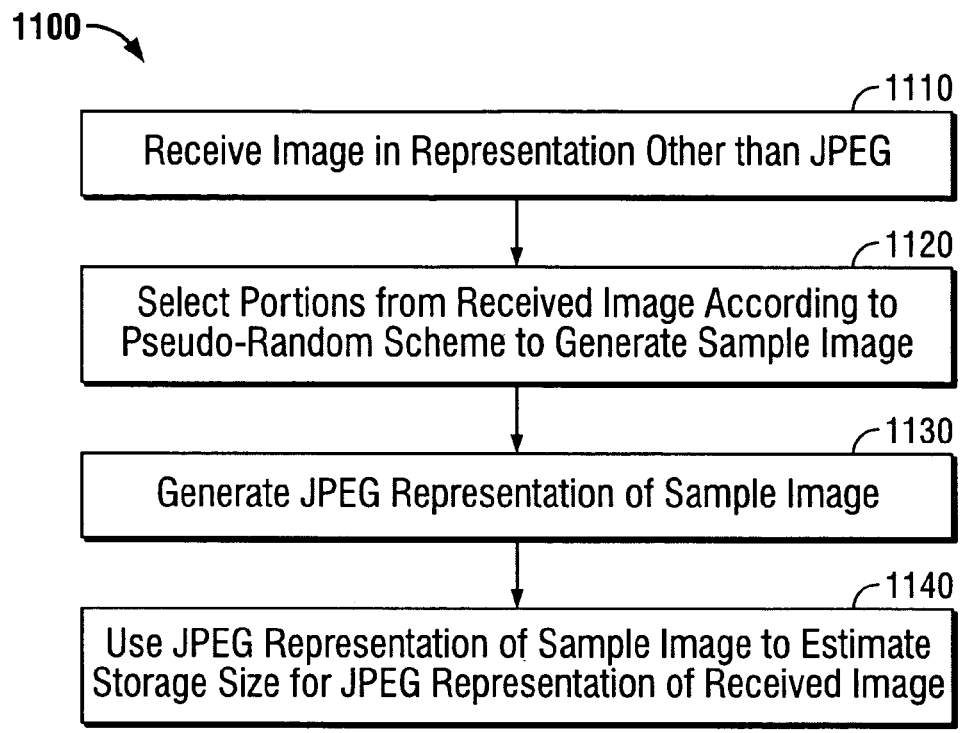

FIG. 11 illustrates a method 1100 for estimating a storage size of a JPEG representation of a digital image. The method 1100 can be performed by a system that includes the storage size estimator 100 (FIG. 1).

The system receives an image in a representation other than a JPEG representation (step 1110). For example, the image can be received directly from an image editing computer application in a bit map. Or a user can select a bit map or a TIFF format of the image for JPEG compression.

The system selects portions from the received image according to a pseudo random scheme to generate a sample image (step 1120). The image portions can be selected to faithfully represent statistical properties of DCT amplitudes for the JPEG representation. If the JPEG representation defines blocks of eight-by-eight pixel for a DCT transformation, the image portions can be selected to include complete eight-by-eight pixel sub-arrays. Furthermore, amplitude values are typically delta-encoded for the zero DCT frequency components in JPEG representations. The delta encoding uses the difference of amplitude values between adjacent sub-arrays in the image. To faithfully represent the delta encoding of the zero DCT frequency component, the system can select about ten or more subsequent sub-arrays in the image along the same direction that is used by the JPEG representation. The sample image is generated from the selected image portions.

The system generates a JPEG representation of the sample image (step 1130). In one implementation, the sample's JPEG representation has higher quality (smaller quantizors) than any of the output JPEG representations for which a storage size should be predicted. Alternatively, the sample's JPEG representation can have substantially the same quality (quantizors) as a particular output JPEG representation.

If the selected portions define a fraction 1/S of the received image, the JPEG representation can be generated from the selected portions about S times faster than a JPEG representation of the entire received image. For the sample image, the fraction 1/S can be selected to optimize the time required for generating the sample image and its JPEG representation while receiving a storage size with an acceptable accuracy. In one implementation, the fraction 1/S is selected from the range between 1/10 and 1/100 for images including one million to 100 million pixels.

The system uses the JPEG representation of the sample image to estimate a storage size for one or more output JPEG representations of the received image (step 1140). In one implementation, the system generates bit width distributions from the sample's JPEG representation, modifies the bit width distributions according to compression parameters for the output JPEG representations, and estimates storage sizes based on the modified bit width distributions. If the sample's JPEG representation has the same quantizors as the particular output JPEG representation, but different pixel resolution, the storage size can be estimated based on the empirical formulas discussed above with reference to FIG. 10. The same JPEG representation of the sample image can be used for multiple storage size estimates.

Instead of JPEG representations, the method 1100 can be used to accelerate estimating storage sizes of any other output representations, such as LZW, Flate or CCITT fax representations. For transmitting an image in a CCITT fax format, a storage size, such as a total number of bits and corresponding transmission time can be estimated by selecting one tenth of the image, generating a sample CCITT fax using the selected portions, and multiplying the storage size of the sample fax by ten. Thus the storage size estimate is approximately accelerated by a factor of ten compared to an estimate that is based on a fax representation of the entire image.

Figure 12:
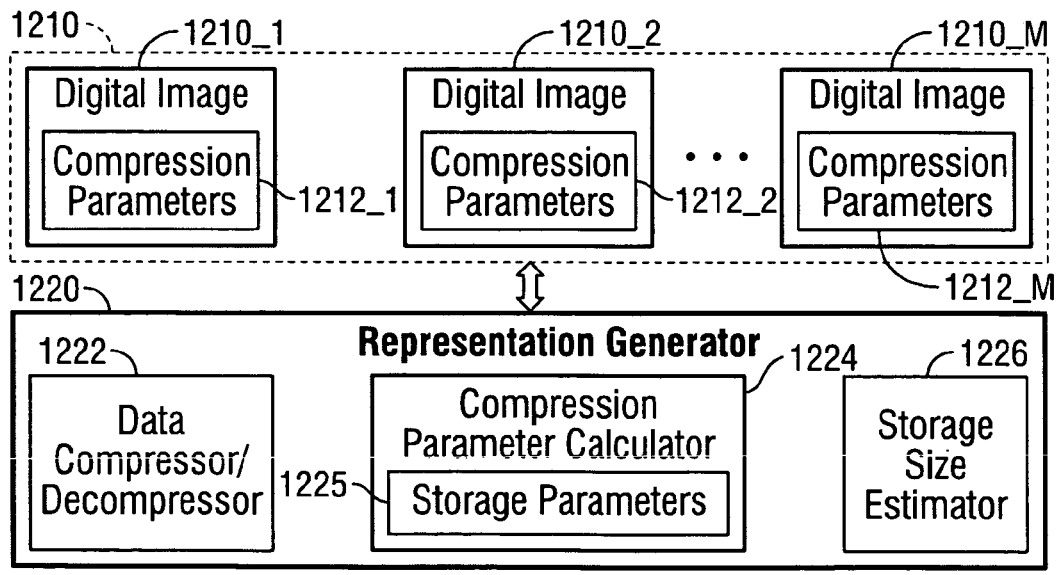
FIG. 12 is a schematic diagram illustrating a representation generator to compress or decompress multiple images.

FIG. 12 illustrates a representation generator 1220 to compress or decompress two or more ("M") digital images 1210_1-1210_M in a set 1210 of digital images. The image set 1210 is a collection of images to be compressed based on storage parameters for the entire collection. The storage parameters can include a desired storage size or image quality for the entire set 1210.

The image set 1210 can be a user selected image collection such as a slide show that the user whishes to compress for archivation. Or the image set 1210 can include images to be stored on a storage device with limited storage size, or to be transmitted by an electronic mail service that sets limitations on the storage size of transmitted files. In one implementation, the representation generator 1220 is implemented in a digital camera or other image capturing device that has limited storage capacity.

In the image set 1210, each image 1210_i (i=1, ..., M) is specified in a compressed representation, such as a JPEG, LZW, Flate or CCITT fax or any other representation. The representation of each image 1210_i has a corresponding set 1212_i of current compression parameters. For JPEG representations, the compression parameters 1212_1-1212_M can include separate resolutions for luminance and chrominance channels, or separate quantizors for different DCT frequency components. Instead of JPEG representations, the images 1210_1-1210_M can be specified in any other compressed representation with or without variable length encoding. Alternatively, one or more images in the set 1210 can be specified in an uncompressed format, such as a bitmap.

The representation generator 1220 includes a data compressor/decompressor 1222, a compression parameter calculator 1224 and a storage size estimator 1226. The compressor/decompressor 1222 generates new compressed representations of the images 1210_1-1210_M. In one implementation, the compressor/decompressor 1222 includes the JPEG generator 320 (FIG. 3A). If a new compressed representation has been generated for an image in the set 1210, the representation generator 1220 can replace the representation of the image in the set 1210 with the new representation. The compressor/decompressor 1222 can also decompress a compressed representation of an image into a bitmap representation, as discussed above with reference to FIGS. 3A-3E. The generated bit map representation can be used to present the image in a user interface.

The compression parameter calculator 1224 calculates new compression parameters for one or more images in the set 1210 based on storage parameters 1225 for the entire set. The storage parameters 1225 can be defined based on hardware limitations, or specified by user input. For example, the storage parameters 1225 can specify a maximum storage size that is based on a capacity of a storage device. Or a user input can specify a preferred storage size or a preferred image quality for the image set 1210.

The compression parameter calculator 1224 can automatically determine new compression parameters for the images in the set 1210 based on the storage parameters 1225. For example, the new compression parameters can be determined by modifying the current compression parameters and estimating a storage size for the modified compression parameters, as discussed below in detail with reference to FIG. 13. The new compression parameters can be used by the compressor/decompressor 1222 to generate new compressed representations for the images in the set 1210.

The storage size estimator 1226 estimates a storage size for the entire image set 1210 based on compression parameters for one or more images in the set 1210. In one implementation, the storage size estimator 1226 includes the storage size estimator 100 (FIG. 1), and can predict a storage size for compressing a particular image. That is, the storage size estimator estimates a storage size for the image without generating the corresponding compressed representation.

In one implementation, the storage size estimator 1226 predicts a storage size for each image in the set 1210, and combines the predicted sizes to estimate a storage size for the entire set 1210. Alternatively, the storage size estimator 1226 can select one or more images from the set 1210, predict a storage size for the selected images, and estimate a storage size for the entire set 1210 based on the predictions for the selected images, as discussed below in more detail with reference to FIG. 14. Thus the storage size estimator 1226 can estimate the storage size for the image set 1210 in a fast and efficient way without generating any compressed representation.

In alternative implementations, the storage size estimator 1226 estimates a storage size for the entire set 1210 based on compressed image representations that are generated by the compressor/decompressor 1222. For example, the storage size estimator 1226 can select one or more uncompressed images from the set 1210, and the compressor/decompressor 1222 can generate compressed representations for the selected images. Or the storage size estimator 1226 can generate a sample image that is based on one or more images in the set 1210, and the compressor/decompressor 1222 can generate a compressed representation of the sample image. Based on the storage size of the generated compressed representations, the storage size estimator 1226 can estimate the storage size for the entire set 1210, as discussed below in more detail with reference to FIG. 14.

The estimated storage size of the image set 1210 can be used by the compression parameter calculator 1224 to calculate new compression parameters for the images in the set 1210, as discussed below with reference to FIG. 13. Alternatively, the storage size estimate can be presented to a user who tries to adjust a quality parameter or another storage parameter for the image set 1210 in a user interface. For the user, the presented estimate provides a useful feedback about the storage size for the current storage parameter.

Figure 13:
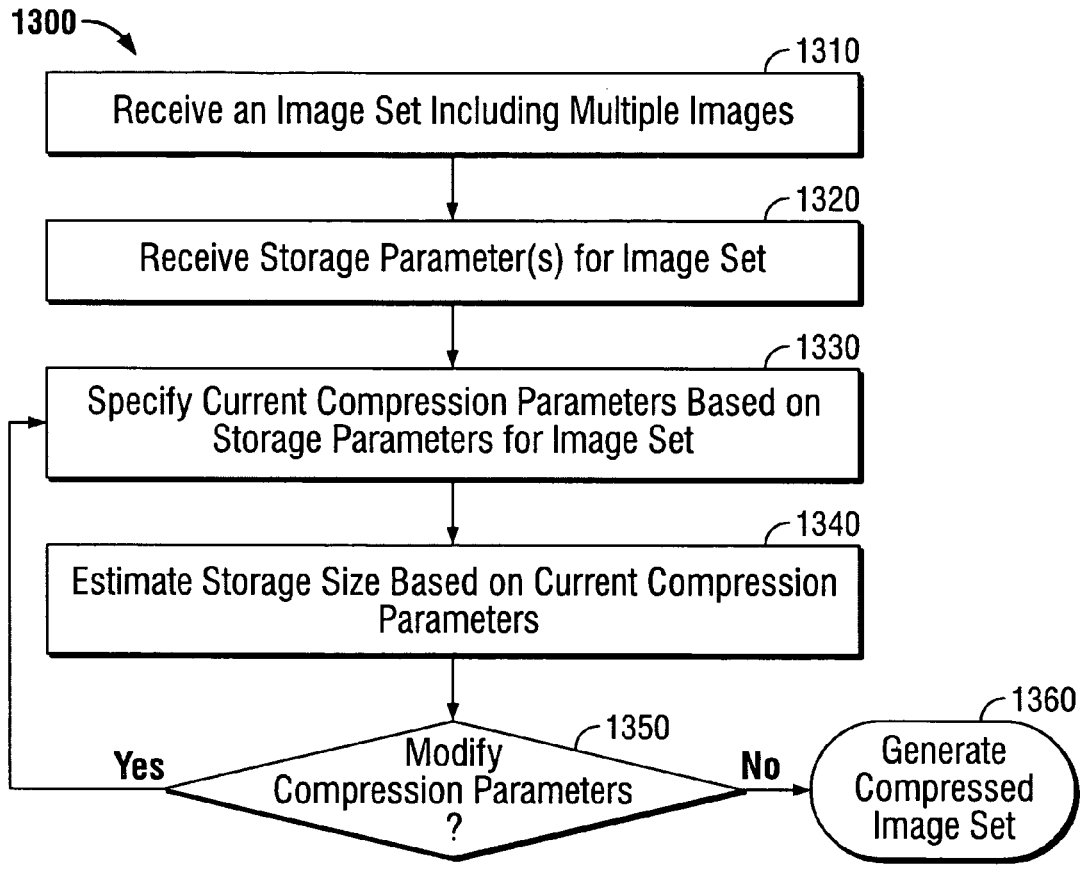

FIG. 13 illustrates a method 1300 for compressing a set of images. The method 1300 can be performed by a system that includes the representation generator 1220.

The system receives an image set that includes multiple images (step 1310). In the received set, each image is specified in a compressed representation characterized by a set of compression parameters that are referred to as input compression parameters. The compressed representations can include any representations where the compressed storage size can be varied by one or more parameters. For a JPEG representation, the input compression parameters can include resolutions for luminance and chrominance channels or quantizors for DCT frequency components. In alternative implementations, one or more images in the received set can be specified in uncompressed representations, such as bitmaps. For uncompressed representation, the system can define compression parameters that will be used as input compression parameters.

The system receives one or more storage parameters for the entire image set (step 1320). The received storage parameters can specify a desired or a maximum storage size for the image set, or a quality parameter that defines resolutions, quantizors or any other parameters related to information loss due to a compression of the image set. The storage parameters can be specified based on user input or characteristics of a storage device. For example, a user can specify a maximum storage size for the received image set, or a maximum quality level for compressing the images in the set. The maximum quality level can be used to select images that have a higher quality than the specified maximum, and the system can generate new representations only for the selected images. Or the user can specify a minimum quality level that defines a lowest quality that is acceptable for the compressed images in the set.

The system specifies current compression parameters for each image in the set based on the storage parameters for the entire image set (step 1330). The current compression parameters can be derived from the input compression parameters of the images in the received set. If the received image set includes uncompressed representations of the images, the system defines high-quality compression parameters that are used instead of the input compression parameters. The specified compression parameters can include resolutions of content channels, quantizors for representation components or any other parameter upon which a storage size of the compressed representation depends.

The current compression parameters can be derived from the input compression parameters based on the received storage parameters, such as a storage size or a quality level for the entire set. To match a maximum quality level for the image set, the system selects images that have higher quality than the maximum quality level, and modifies the input compression parameters only for the selected images to match the maximum quality level.

To decrease the storage size below a maximum storage size for the entire set, the system selects one or more images in the received set, and modifies the input compression parameters to decrease the storage size of the selected images. Typically, the storage size is decreased by decreasing the input quality that is defined by the input compression parameters. For example, the resolution can be decreased in one or more content channels, or the quantizors can be increased for one or more representation components. If a minimum quality level is defined for the image set, the system can specify only compression parameters that define qualities above the defined minimum.

In one implementation, the storage size is decreased according to a predefined schedule. For example, first the quantizors are increased for the representation components, and next the resolution is decreased for one or more content channels. The predefined schedule can be optimized for human perception of image quality, or can be previously set based on user input.

The system estimates a storage size for the entire image set based on the current compression parameters (step 1340). In one implementation, the system estimates a separate storage size for each image in the set based on the corresponding current compression parameters, and combines the estimated storage sizes of the individual images into an estimate for the entire set. The system can predict the storage size for each image without actually generating the compressed representation according to the current compression parameters. Thus the storage size can be quickly and efficiently estimated for image sets that include a small number of images, such as less than about ten or less than about five images.

To increase efficiency for image sets that include more images, the system can select a few images from the set, predict respective storage sizes for the selected images based on the current compression parameters, and estimate a storage size for the entire set based on the predictions for the selected images.

In alternative implementations, the storage size can be determined for one or more images in the set by actually generating the compressed representations according to the current compression parameters, and determining the storage size of the generated representations.

The system determines whether the current compression parameters should be modified (decision 1350). To match a maximum storage size for the image set, the system compares the estimated storage size with the maximum storage, and modifies the compression parameters if the estimated storage size is larger than the maximum storage size. To match a desired storage size, the system determines whether the estimated storage size is out of or within a predefined tolerance about the desired storage size, and decides to modify or not to modify the compression parameters accordingly.

Alternatively, the system can present the current storage size estimate to a user, and request user input to determine whether the current compression parameters should be modified. If the user has specified a desired quality level for the image set, the system presents the estimated storage size that corresponds to the desired quality level. Thus the user can decide based on the estimated storage size whether the current compression parameters should be modified or not. If the user modifies the desired quality level for the image set, the system determines that the current compression parameters should be modified.

If the compression parameters should be modified ("Yes" branch of decision 1350), the system specifies new compression parameters (returns to step 1330). When the system returns to step 1330, the new compression parameters can be specified based on the previous compression parameters in addition to the input compression parameters. For example, the system can compare the storage sizes for the previous and input compression parameters, and based on the comparison, determine whether quality should be increased or decreased relative to the quality defined by the previous compression parameters.

If the compression parameters should not be modified ("No" branch of decision 1350), the system uses the current compression parameters to generate compressed representations for the images in the image set (step 1360).

Figure 14:
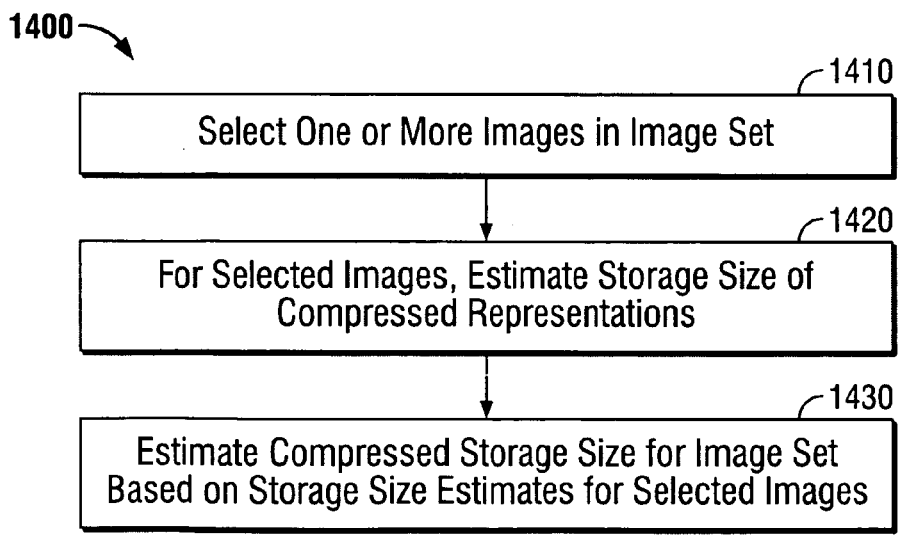

FIG. 14 illustrates a method 1400 for estimating storage size for compressing an image set including multiple images. The method 1400 can be performed by a system that includes the representation generator 1220.

The system selects one or more images in the image set (step 1410). The images are selected to represent the image set for estimating a storage size for the entire set. In one implementation, the number of selected images depends upon the number of images in the entire set. For example, the system selects about five images if the set includes more than five but less than twenty-five images. For image sets including more than twenty-five images, the number of selected images can be about the square root of the number of images in the set. Alternatively, the number of selected images can be a linear or other increasing function of the number of images in the set.

In alternative implementations, the system selects a predefined number of images, or requests user input to determine the number of selected images. The user input can indicate the number of selected images explicitly. Alternatively, the user input can indicate a tolerance for the storage size estimate and the system can determine the number of selected images based on the indicated tolerance.

In one implementation, all the images in the set have the same type of input representation, and the system selects the images that have the largest input storage sizes in that type of representation. In consumer applications, the image set often includes JPEG images whose input storage size and compression parameters moderately vary from image to image. For example, the image set can include photographs captured with the same image capturing device. In such implementations, complex scenes are likely represented by the JPEG images having the largest input storage sizes in the image set. Although the complex scenes generate more high DCT frequency components, the lower DCT components are also present in these images. Thus it is reasonable to assume that the JPEG images with the largest storage sizes will also represent how the smaller DCT frequency components will be compressed in the JPEG images that have less complexity and smaller storage size. If the input storage size varies substantially from image to image in the set, the images with the largest storage sizes may dominate the storage size for the entire set. Thus selecting the images with the largest storages sizes is typically advantageous for predicting how the entire set will be compressed.

Instead of selecting only images having the largest storage sizes, the system can also select images that have other input storage sizes in the image set. For example, images with small input storage sizes can be selected from image sets that include only a few images having large input storage sizes and a large number of images that have small input storage sizes.

For the selected images, the system estimates storage size of compressed representations based on current compression parameters (step 1420). In one implementation, the system includes the storage size estimator 100 (FIG. 1), and predicts the storage sizes for the selected images without actually generating the corresponding compressed representations. Thus the storage size of the selected images can be quickly and efficiently estimated. In alternative implementations, the system generates the compressed representations for one or more of the selected images, and determines the storage size of the generated representations.

The system estimates a compressed storage size for the entire image set based on the storage size estimates for the selected images (step 1430). In one implementation, the system estimates that the storage size for the entire image set is changing in proportion to the storage size change for the selected images. That is, the system determines a compression ratio from the estimated and input storage sizes for the selected image, and multiplies the compression ratio with the input storage size for the entire image set.

In alternative implementations, the system can classify the images in the set and determine a respective compression ratio for each class. For example, the images can be classified based their input storage sizes or input compression parameters in the image set. For a particular class, the compression ratio may be estimated based on storage size estimates for selected members of the class. A compression ratio of one is used for images whose representation remains unchanged in the compressed set. Each compression ratio can be used to estimate the compressed storage size for the images in that class. The estimate for the entire set is obtained by summing up the estimated storage sizes for all classes representing the set.

Figure 15:
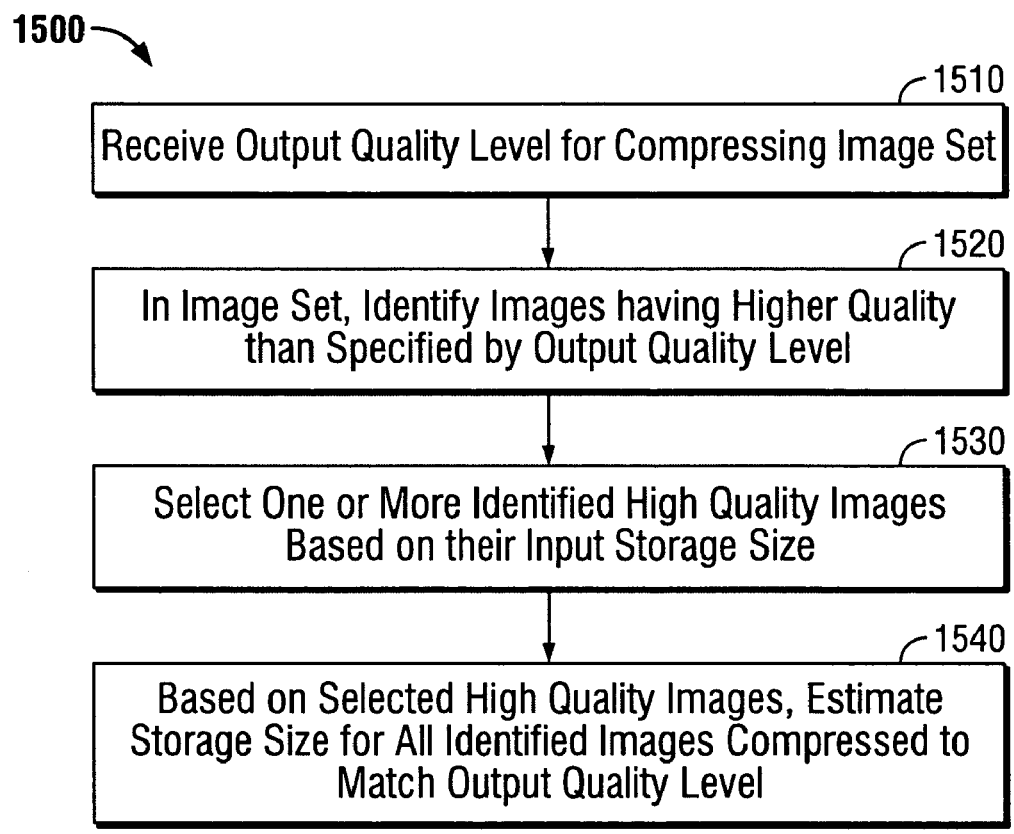

FIG. 15 illustrates a method 1500 for estimating a storage size based on an output quality level specified for compressing images in an image set. In the image set, the images are represented in input representations, and the output quality level is specified for compressing the images into output representations. For example, input JPEG representations of the images are compressed into more compact output JPEG representations. The method 1500 can be performed by a system that includes the representation generator 1220.

The system receives an output quality level for compressing an image set (step 1510). For example, the output quality level can be received from a user, as discussed in more detail below with reference to FIGS. 17-18B. In one implementation, the output quality level specifies a respective minimum quantizor for each representation component in the output representation. For JPEG representations, a discrete set of quality levels can be defined, for example, by integer numbers between zero and twelve. Each quality level corresponds to a respective quantizor table for DCT frequency components. As the quality level increases, the respective quantizor decreases or remains unchanged for each DCT frequency component.

In alternative implementations, the output quality level specifies a respective maximum resolution for one or more content channels in the output representation. For JPEG representations, the output quality level can correspond to a first resolution in the luminance channel and a second resolution in the chrominance channels. As the output quality increases, the respective resolution increases or remains unchanged in each of the luminance and chrominance channels.

In the image set, the system identifies images that have higher quality than specified by the output quality level (step 1520). That is, the high quality images have smaller quantizors for one or more representation components, or larger resolution for one or more content channels.

The system selects one or more of the identified high quality images based on their input storage size (step 1530). In one implementation, the system selects images that have the largest input storage sizes among the identified high quality images. Alternatively, the system selects images whose storage sizes represent those for all the high quality images.

Based on the selected high quality images, the system estimates a storage size for compressing all the high quality images to match the output quality level (step 1540). In one implementation, the system first estimates a respective storage size for compressing each of the selected images to match the output quality level, and determines a compression ratio relative to the input storage size of the selected images. Next, the system uses the compression ratio to estimate a compressed storage size for all images that are identified to have higher quality than that specified by the output quality parameter.

Figure 16:
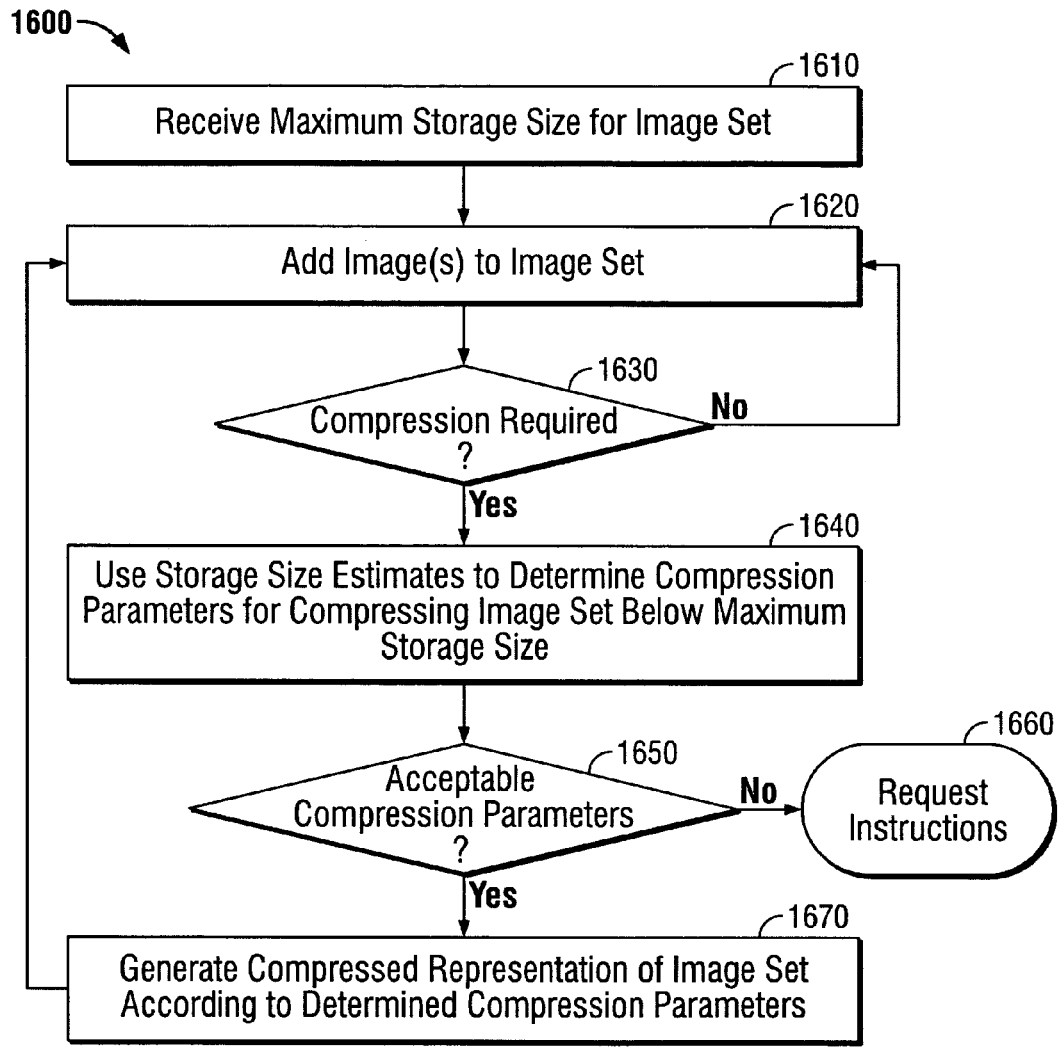

FIG. 16 illustrates a method 1600 for storing an image set that includes an increasing number of images. The method 1600 can be performed by a system that includes the representation generator 1220. In one implementation, the system includes a storage device or an image capturing device that has a limited storage capacity to store an image set that includes an increasing number of images.

The system receives a maximum storage size for the image set (step 1610). The maximum storage size can be based on user input or a limited storage capacity of a device that stores the image set. For example, a user can set the maximum storage size to limit the storage capacity that is used to store the image set.

The system adds one or more images to the image set (step 1620), and determines whether the image set should be compressed to match the maximum storage size (decision 1630). If no compression is required ("No" branch of decision 1630), the system waits until more images are added to the image set (return to step 1620).

If the storage size of the image set exceeds the maximum storage size, the system determines that the image set should be compressed ("Yes" branch of decision 1630). The system uses storage size estimates to determine compression parameters for compressing the storage size of the image set below the maximum storage size (step 1640). For JPEG images, the determined compression parameters can include quantizor tables for DCT frequencies or resolutions for luminance or chrominance channels. In one implementation, the system includes the storage size estimator 100 to predict storage size estimates for trial compression parameters without generating the corresponding trial compressed representations. Based on the predictions, the system can quickly and efficiently determine compression parameters for compressing the image set below the maximum storage size.

The system verifies whether the determined compression parameters are acceptable (decision 1650). In one implementation, the system verifies whether the determined compression parameters define a quality that is above a minimal quality. The minimal quality can be specified by minimal resolutions for content channels or by maximum quantizors for representation components. The minimal quality can also be specified as a particular level on a predefined scale that includes discrete levels corresponding to different resolutions or quantizor tables.

If the compression parameters are not acceptable ("No" branch of decision 1650), the system requests further instructions (step 1660). For example, the system can notify a user or a system operator that the image set with the added images cannot be compressed below the maximum storage size according to the minimal quality. Thus the user or the system operator can instruct the system to change the allowed maximum storage size or minimum image quality, or to decrease the number of images in the image set. In alternative implementations, the system can automatically store only the previous image set without the added images.

If the compression parameters are acceptable ("Yes" branch of decision 1650), the system generates a new compressed representation of the image set according to the determined compression parameters (step 1670), and waits until new images are added to the image set (return to step 1620).

Figure 17:
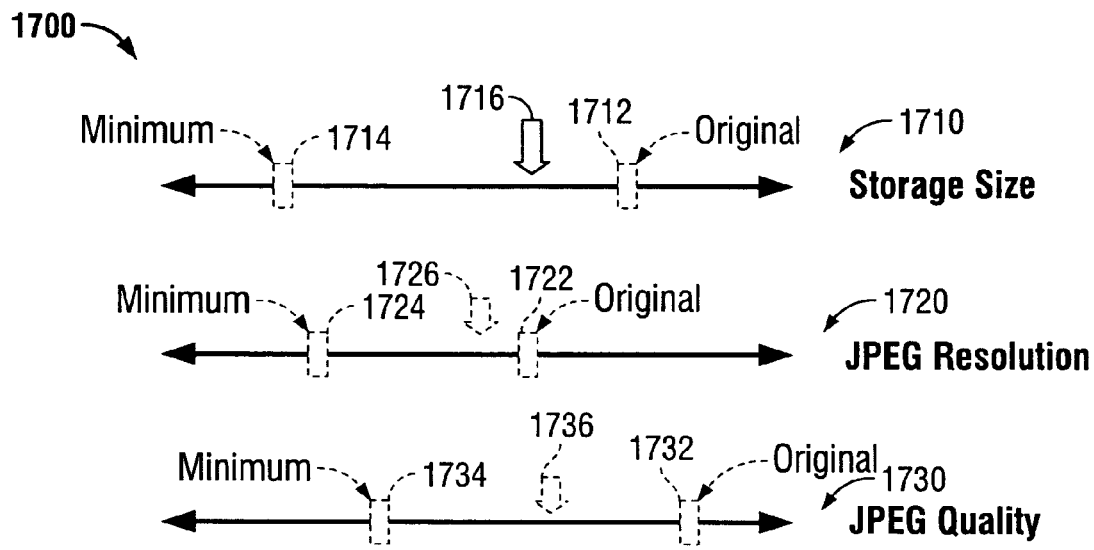
FIGS. 17-19 are schematic diagrams illustrating exemplary user interfaces for compressing digital images.

FIG. 17 illustrates an exemplary user interface 1700 for specifying compression parameters for an output JPEG representation of a digital image. The user interface 1700 can be used by a system that includes the representation generator 1220 (FIG. 12). The system receives the digital image in an input JPEG representation and compresses it into an output JPEG representation. In alternative implementations, the user interface 1700 can be used to compress more than one images or to generate compressed representations other than JPEG representations.

The user interface 1700 includes a storage size slider 1710, a JPEG resolution slider 1720 and a JPEG quality slider 1730 to indicate or to set storage parameters for the output JPEG representation. The storage size slider 1710 is used to indicate or set a storage size for the output JPEG representation, the JPEG resolution slider 1720 is used to indicate or set a resolution in the luminance or chrominance channels for the output JPEG representation, and the JPEG quality slider 1730 is used to indicate or set a JPEG quality for the output JPEG representation. The JPEG quality represents a quality level in a set of predefined quality levels, where each quality level corresponds to a respective predefined quantizor table for DCT frequency components. For each DCT component, the corresponding quantizor increases or remains unchanged as the quality level increases.

In alternative implementations, one or more of the sliders 1710, 1720 and 1730 can be omitted, or the user interface 1700 can specify different sliders. For example, the user interface can include only the storage size slider 1710 and the JPEG quality slider 1730. Or the JPEG resolution slider 1720 and JPEG quality slider 1730 can be combined into a single combined quality slider. On the combined quality slider each position can correspond to a predefined combination of a JPEG resolution and a JPEG quality. The combination of JPEG resolution and quality can be selected to provide an optimized visual perception of the compressed image. For a typical image, more quality degradation is perceived for decreasing JPEG resolution than for decreasing JPEG quality. Thus the combined quality parameter can be defined such that as it decreases from its maximum value, the JPEG quality is decreased first without changing the JPEG resolution, and the JPEG resolution is decreased only at low JPEG qualities.

The input JPEG representation is characterized by an original storage size, an original JPEG resolution and an original JPEG quality that are represented on the sliders 1710, 1720 and 1730 by input markers 1712, 1722 and 1732, respectively. The input markers 1712, 1722 and 1732 also indicate a maximum storage size, a maximum JPEG resolution and a maximum JPEG quality, respectively, for the output JPEG representation, because these storage parameters are not increased when the image is compressed.

On the sliders 1710, 1720 and 1730, minimum markers 1714, 1724 and 1734 indicate minimum storage parameters for the output JPEG representation, in particular, a minimum storage size, a minimum JPEG resolution and a minimum JPEG quality, respectively. These minimum storage parameters are defined to keep parameters of the output JPEG representation within an acceptable range. The minimum storage parameters can be specified in absolute units, such as 20 kByte for a minimum storage size or 640×320 pixels for minimum luminance resolution. Alternatively, one or more minimum storage parameters can be specified by percentages relative to the respective original parameters. The minimum storage parameters can also be defined based on user input, for example, by allowing the user to move the minimum markers 1714, 1724 and 1734 on the respective sliders 1710, 1720 and 1730.

In the exemplary implementation of FIG. 17, the input markers 1712, 1722 and 1732 and the minimum markers 1714, 1724 and 1734 include graphical representations of rectangles that are positioned on the respective sliders 1710, 1720 and 1730. In alternative implementations, the input markers 1712, 1722, 1732 or the minimum markers 1714, 1724 and 1734 can be omitted, hidden or indicated by audio or animated presentations. For example, one or more of the markers can be indicated by a dinging bell, similar to indicating margins on a traditional typewriter.

On each slider 1710, 1720 and 1730 a respective cursor 1716, 1726 and 1736 indicates a current value of the corresponding storage parameter for the output JPEG representation. The user can select and move one of the cursors 1716, 1726 and 1736 to specify storage parameters for the output JPEG representation. In the example illustrated in FIG. 17, the cursor 1716 is selected by the user to specify a desired storage size for the output JPEG representation. Alternatively, the user can select the cursor 1726 or 1736 to specify a desired JPEG resolution or a desired JPEG quality, respectively.

The cursors 1716, 1726 and 1736 are coupled to each other by the system. Thus when the user moves the cursor 1716 to a position corresponding to a particular storage size for the output JPEG representation, the system calculates compression parameters for the particular storage size, for example, as discussed above with reference to FIG. 13. Based on the compression parameters, the system determines a JPEG resolution and a JPEG quality for the particular storage size, and moves the cursors 1726 and 1736 to positions that correspond to the determined JPEG resolution and quality, respectively. Thus the user receives a visual feedback on how the JPEG resolution and quality change if the input JPEG representation is compressed to the particular storage size. Based on such visual feedback, the user can make more informed decisions about how to compress the image.

To calculate the compression parameters for the particular storage size, the system can predict the storage sizes for trial compression parameters without generating the corresponding compressed representations. Thus the compression parameters can be calculated quickly and efficiently. In one implementation, the system performs the calculations for coupling the cursors 1716, 1726 and 1736 in a fraction of a second, such as less than about one hundred milliseconds. Thus the cursors 1716, 1726 and 1736 can be coupled in real time, without a delay perceivable to the user who is moving the cursor 1716 to select a desired storage size.

Alternatively, the user can select and move the cursor 1726 to adjust the JPEG resolution for the output representation. Then the system calculates the corresponding storage size and JPEG quality, and adjusts the position of the cursors 1716 and 1736, respectively, to provide a visual feedback to the user. Or the user can select and move the cursor 1736 to adjust the JPEG quality for the output representation. Thus the system calculates the corresponding storage size and JPEG resolution, and adjusts the position of the cursors 1716 and 1726, respectively, to provide a visual feedback to the user.

In alternative implementations, the cursors 1726 and 1736 for the JPEG resolution and JPEG quality can be coupled only to the cursor 1716 for the storage size, without being coupled to each other. Thus the user can set a particular JPEG resolution, and vary the JPEG quality to see how the storage size is changing for different JPEG qualities at the particular JPEG resolution. Or vice versa, the JPEG resolution can be varied for a particular JPEG quality. Alternatively, the cursors 1726 and 1736 for the JPEG resolution and JPEG quality can be strictly coupled to each other according to a predefined relation. Thus any position of the cursor 1726 corresponds to a predefined position of the cursor 1736, and vice versa, to provide the predefined relation between the JPEG resolution and JPEG quality. The predefined relation can correspond to a combination of JPEG resolution and quality that is optimized for human perception of image quality.

Figure 18A:
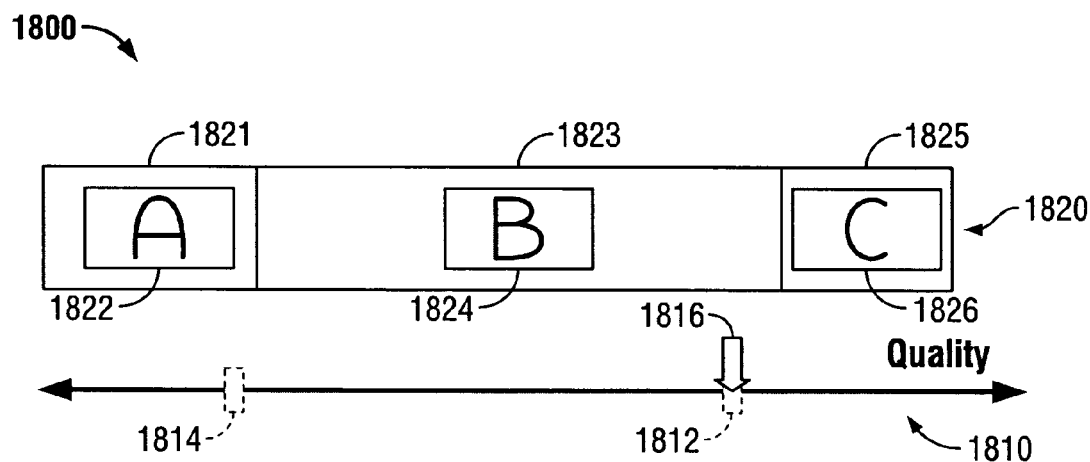

FIG. 18A illustrates an exemplary user interface 1800 for specifying compression parameters for output representations of multiple digital images in a set of images. The user interface 1800 can be used by a system that includes the representation generator 1220 (FIG. 12). The system receives the set in which the images are represented in input representations that should be compressed into output representations that are more compact than the input representations. The image set is characterized by an original storage size and an original quality parameter in the input representation. In one implementation, both the input and output representations are JPEG representations, and the original quality parameter represents a maximum JPEG quality or a maximum JPEG resolution, or a combination of JPEG quality and resolution.

The user interface 1800 includes a slider 1810 to specify a storage parameter for the entire image set, and a graphical size representation 1820 to indicate storage sizes for the images in the image set. The indicated storage sizes correspond to the storage parameter specified on the slider 1810.

The slider 1810 specifies a maximum quality parameter for the output representations of all images in the set. The maximum quality parameter can correspond to a maximum resolution in a content channel, or minimum quantizors for representation components. On the slider 1810, the original quality parameter is represented by an input marker 1812. A minimum quality parameter is also represented on the slider 1810 by a minimum marker 1814. The minimum quality parameter defines a minimum acceptable output representation. For the output representation, a current value of the quality parameter is specified by a cursor 1816. In the example illustrated in FIG. 18A, the cursor 1816 is positioned at the input marker, thus it specifies no compression for the image set.

The size representation 1820 illustrates the original storage sizes of the images in the set. In the example, the image set includes three images for which the size representation 1820 defines respective rectangles 1821, 1823 and 1825. Each of the rectangles 1821, 1823 and 1825 has a horizontal length that is proportional to the storage size of the corresponding image. The rectangles 1821, 1823 and 1825 are arranged adjacent to each other in a row such that the size representation 1820 has a total horizontal length that is the sum of the horizontal lengths of the rectangles 1821, 1823 and 1825. Thus the total horizontal length of the size representation 1820 is proportional to the storage size of the entire image set.

Each of the rectangles 1821, 1823 and 1825 includes a corresponding image representation 1822, 1824 and 1826, respectively. The image representation 1822 is a graphical representation of the first image (illustrating the letter "A") in the set. Since the image representation 1822 is enclosed in the rectangle 1821, the user can easily recognize that the rectangle 1821 indicates the storage size of the first image. Similarly, the image representations 1824 and 1826 are graphical representations of the second image (illustrating the letter "B") and the third image (illustrating the letter "C") in the set, and visually identify that the rectangles 1823 and 1825 indicate the storage size for the second and third images, respectively.

Figure 18B:
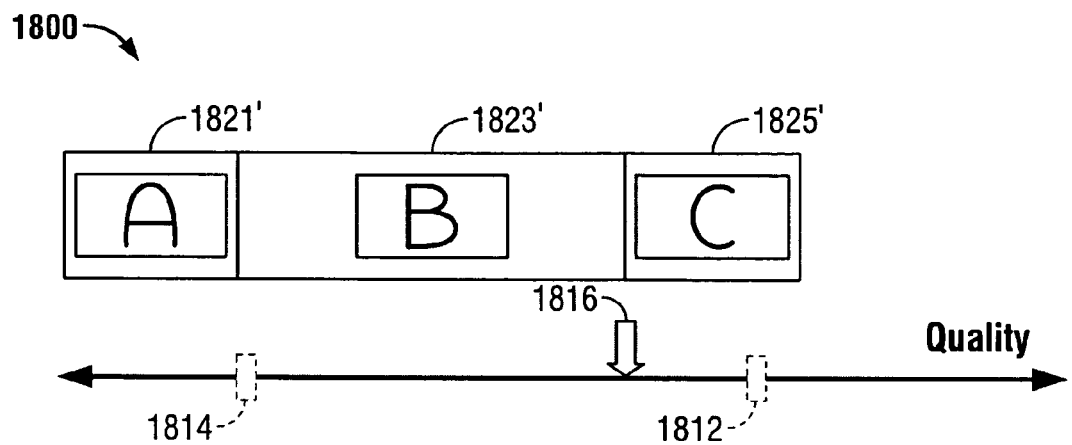

FIG. 18B illustrates the user interface 1800 when the user has moved the cursor 1816 on the slider from the input marker 1812 to a position that is in between the minimum marker 1814 and the input marker 1812. Thus the user indicated that the image set should be compressed to match a reduced quality represented by that position. Based on the reduced quality, the system has estimated the compressed storage size for each image in the set, and presented a modified size representation 1820' to illustrate the compressed storage sizes.

The modified size representation 1820' defines respective rectangles 1821', 1823' and 1825' for the three images in the set. Each of the rectangles 1821', 1823' and 1825' encloses the corresponding image representation 1822, 1824, and 1826, and has a horizontal length that is proportional to the compressed size of the corresponding image. The rectangles 1821', 1823' and 1825' are arranged in a row adjacent to each other so the total horizontal length of the modified size representation 1820' is proportional to the storage size for the entire image set.

In the illustrated example, the first and third rectangles 1821' and 1825' illustrate that the storage sizes of the first and third images would be slightly reduced due to the compression, while the second rectangle 1823' indicates that the storage size of the second image would be substantially reduced. Thus the user can identify the compressed storage size not only for the entire set but also separately for each image in the set.

In alternative implementations, the slider 1810 can specify the compressed storage size for the entire set. Thus as the cursor 1816 is moved from the input marker 1812 to the position 1818, the size representation 1820' indicates separately for each image in the set how the storage size has changed for the respective image. Instead of the single slider 1810, the user interface 1810 can use coupled sliders similar to those discussed above with reference to FIG. 17.

Figure 19:
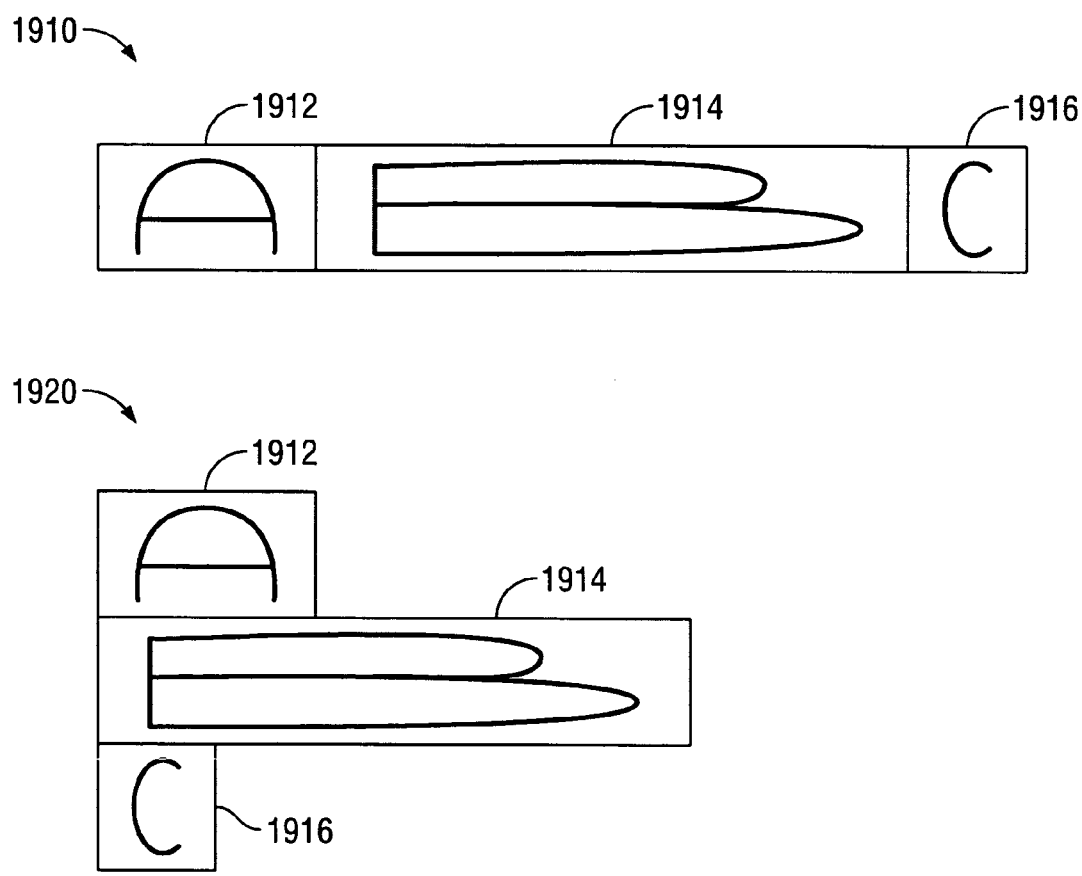

FIG. 19 illustrates exemplary size representations 1910 and 1920 that can be used to indicate storage sizes for multiple images. For example, the size representation 1910 or 1920 can be used instead of the size representation 1820 (FIG. 18A).

The size representation 1910 indicates storage sizes for the three images (illustrating the letters "A", "B" and "C", respectively) that are also illustrated in FIGS. 18A and 18B. The size representation 1910 includes three rectangular image representations 1912, 1914 and 1916 whose horizontal lengths are proportional to the storage sizes of the respective images. Thus the first image representation 1912 is horizontally stretched to have a horizontal length that is proportional to the storage size of the first image in the set. Similarly the second and third image representations 1914 and 1916 are horizontally stretched to have a horizontal length that is proportional to the storage size of the second and third images, respectively. The image representations 1912, 1914 and 1916 are arranged in a row adjacent to each other such that the total length of the size representation 1910 is proportional to the total storage size for the entire image set.

The size representation 1920 illustrates an alternative arrangement for the image representations 1912, 1914 and 1916. In the size representation 1920, the image representations 1912, 1914 and 1916 are arranged vertically such that the image representations' left side is aligned to the same horizontal position. Thus the right side of each image representation indicates the storage size of the respective image. The size representation 1920 emphasizes the variations in the storage sizes of the images. The size representation 1920 can be advantageously used if the total size for the image set is known or has less importance than the variations. For example, the size representation 1920 can be presented in a user interface while the user is adjusting a storage size slider similar to that of FIG. 17.

In alternative implementations, the image representations can have other linear sizes that are proportional to the indicated storage sizes. For example, each image representation can be stretched vertically to have a vertical size that is proportional to the storage size of the corresponding image. The vertically stretched image representations can be arranged in a single column whose height is proportional to the storage size for the entire image set. Or the vertically stretched image representations can be arranged to form a histogram.

The systems and techniques described in this application can be implemented in one or more software applications, as a plug-in to a software application, or in hardware of electronic devices, such as image capturing or displaying devices, for example digital cameras, CCD devices, scanners, or portable devices such as personal digital assistants or mobile phones. For portable devices, the system or portions of it can be implemented on a remote server.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

By way of example, a printing device implementing an interpreter for a page description language, such as the PostScript® language, includes a microprocessor for executing program instructions (including font instructions) stored on a printer random access memory (RAM) and a printer read-only memory (ROM) and controlling a printer marking engine. The RAM is optionally supplemented by a mass storage device such as a hard disk. The essential elements of a computer are a processor for executing instructions and a memory. A computer can generally also receive programs and data from a storage medium such as an internal disk or a removable disk. These elements will also be found in a conventional desktop or workstation computer as well as other computers suitable for executing computer programs implementing the methods described here, which can be used in conjunction with any digital print engine or marking engine, display monitor, or other raster output device capable of producing color or gray scale pixels on paper, film, display screen, or other output medium.

The invention has been described in terms of particular embodiments. Other embodiments are within the scope of the following claims. For example, the steps of the invention can be performed in a different order and still achieve desirable results. Although some of the techniques are described for representations that use variable length encoding, such as JPEG representations of digital images, these techniques can be also applied to other data representations, such as Lempel-Zif-Welch ("LZW") representations, representations using Flate or another compressed format such as the fax format of the Comité Consultatif International Téléphonique et Télégraphique (CCITT).

What is claimed is:

1. A method for processing digital data, the method comprising:
   receiving digital data;
   identifying code values of an input representation of the received digital data, the code values having variable bit widths and representing data values for one or more representation components, where a bit width of a particular data value identifies a number of valuable bits in the data value;
   for each representation component, generating a first bit width distribution that defines a respective frequency of occurrence for two or more different bit widths based on bit widths of data values for that representation component in the input representation; and
   using the generated first bit width distributions to estimate a storage size of an output representation that uses code values having variable bit widths to represent the digital data.

2. The method of claim 1, wherein:
   receiving digital data includes receiving the digital data in the input representation.

3. The method of claim 1, wherein the representation components include frequency components of a discrete Fourier transform or a discrete cosine transform.

4. The method of claim 1, wherein the digital data includes a digital image.

5. The method of claim 4, wherein the input representation includes an input JPEG representation of the digital image.

6. The method of claim 5, wherein the output representation includes an output JPEG representation of the digital image.

7. The method of claim 5, further comprising:
   generating the input JPEG representation from a bitmap representation of the digital image.

8. The method of claim 7, wherein:
   generating the input JPEG representation includes sampling the bitmap representation of the digital image.

9. The method of claim 1, wherein the input representation includes markers to identify code values, the markers being encoded based on a first Huffman encoding.

10. The method of claim 9, wherein the markers include code heads and end-of-block markers.

11. The method of claim 9, wherein the output representation includes markers encoded based on a second Huffman encoding.

12. The method of claim 11, wherein the second Huffman encoding is different from the first Huffman encoding.

13. The method of claim 1, wherein:
   estimating a storage size of the output representation includes estimating a total number of bits in the output representation.

14. The method of claim 1, wherein:
   estimating a storage size of the output representation includes estimating a transmission time for transmitting the output representation over a link.

15. The method of claim 1, further comprising:
   receiving one or more compression parameters for the output representation.

16. The method of claim 15, wherein estimating the storage size of the output representation includes:
   determining a respective bit reduction for each representation component based on one or more of the compression parameters;
   for each representation component, modifying the first bit width distribution based on the respective bit reduction to generate a second bit width distribution that specifies estimated frequencies of occurrence for bit widths in the output representation; and
   using the second bit width distribution to estimate the storage size of the output representation.

17. The method of claim 16, wherein the compression parameters specify a respective quantizor for each representation component, and wherein:
   determining the respective bit reduction for each representation component includes determining the respective bit reduction based on the respective quantizor for each representation component.

18. The method of claim 16, wherein estimating the storage size of the output representation includes:
   for each representation component, estimating a respective average number of code bits for each bit width in the second bit width distribution; and
   using the second bit width distribution to estimate the storage size includes multiplying the respective average number of code bits with the estimated frequencies of occurrence specified by the second bit width distribution.

19. The method of claim 18, wherein:
   the corresponding average number of bits is estimated based on bit widths in the input representation.

20. The method of claim 15, wherein the digital data includes a digital image and the compression parameters specify an output pixel resolution of the digital image in the output representation, and wherein:
   estimating the storage size of the output representation includes estimating the storage size based on the output pixel resolution.

21. The method of claim 20, wherein the input representation specifies an input pixel resolution of the digital image, and wherein:
   estimating the storage size based on the output pixel resolution includes using a square root of the ratio of the input pixel resolution and the output pixel resolution.

22. A system for processing digital data, the system comprising:
   an input device to receive user input specifying parameters for generating an output representation of digital data, the output representation using code values having variable bit widths to represent the digital data; and
   a data processing device configured to:
      identify code values of an input representation of the digital data, the code values having variable bit widths and representing data values for one or more representation components, where a bit width of a particular data value identifies a number of valuable bits in the data value;
      generate a first bit width distribution for each representation component, the first bit width distribution defining a respective frequency of occurrence for two or more different bit widths based on bit widths of data values for the representation component in the input representation; and
      use the generated first bit width distributions to estimate a storage size of the output representation.

23. The system of claim 22, wherein the data processing device includes one or more components of a computer.

24. The system of claim 22, wherein the data processing device includes data processing components in a portable image capturing or image displaying device.

25. The system of claim 22, further comprising:
   a data storage device having an available storage capacity to store the digital data.

26. The system of claim 25, wherein:
   the data processing device is configured to determine compression parameters for the output representation of the digital data based on the available storage capacity of the data storage device.

27. The system of claim 22, further comprising:
   a display device to present the estimated storage size of the output representation.

28. The system of claim 27, wherein the digital data includes one or more digital images, and wherein:
   the data processing device is configured to generate a graphical representation to indicate a respective storage size for each digital image, the graphical representation including a respective graphics object for each digital image, the respective graphics object including a visual representation of the digital image and having a linear size that is proportional to the storage size of the digital image; and
   the display device is configured to present the generated graphical representation.

29. A computer program product, tangibly embodied in a computer-readable storage device, for processing digital data, the computer program product comprising instructions operable to cause one or more data processing apparatus to perform operations comprising:
   receiving digital data;
   identifying code values of an input representation of the received digital data, the code values having variable bit widths and representing data values for one or more representation components, where a bit width of a particular data value identifies a number of valuable bits in the data value;
   for each representation component, generating a first bit width distribution that defines a respective frequency of occurrence for two or more different bit widths based on bit widths of data values for that representation component in the input representation; and
   using the generated first bit width distributions to estimate a storage size of an output representation that uses code values having variable bit widths to represent the digital data.

30. The computer program product of claim 29, wherein:
   receiving digital data includes receiving the digital data in the input representation.

31. The computer program product of claim 29, wherein the representation components include frequency components of a discrete Fourier transform or a discrete cosine transform.

32. The computer program product of claim 29, wherein the digital data includes a digital image.

33. The computer program product of claim 32, wherein the input representation includes an input JPEG representation of the digital image.

34. The computer program product of claim 33, wherein the output representation includes an output JPEG representation of the digital image.

35. The computer program product of claim 33, further comprising instructions operable to cause one or more data processing apparatus to perform operations comprising:

generating the input JPEG representation from a bitmap representation of the digital image.

36. The computer program product of claim 35, wherein: generating the input JPEG representation includes sampling the bitmap representation of the digital image.

37. The computer program product of claim 29, wherein the input representation includes markers to identify code values, the markers being encoded based on a first Huffman encoding.

38. The computer program product of claim 37, wherein the markers include code heads and end-of-block markers.

39. The computer program product of claim 37, wherein the output representation includes markers encoded based on a second Huffman encoding.

40. The computer program product of claim 39, wherein the second Huffman encoding is different from the first Huffman encoding.

41. The computer program product of claim 29, wherein:
estimating a storage size of the output representation includes estimating a total number of bits in the output representation.

42. The computer program product of claim 29, wherein:
estimating a storage size of the output representation includes estimating a transmission time for transmitting the output representation over a link.

43. The computer program product of claim 29, further comprising instructions operable to cause one or more data processing apparatus to perform operations comprising:
receiving one or more compression parameters for the output representation.

44. The computer program product of claim 43, wherein estimating the storage size of the output representation includes:
determining a respective bit reduction for each representation component based on one or more of the compression parameters;
for each representation component, modifying the first bit width distribution based on the respective bit reduction to generate a second bit width distribution that specifies estimated frequencies of occurrence for bit widths in the output representation; and
using the second bit width distribution to estimate the storage size of the output representation.

45. The computer program product of claim 44, wherein the compression parameters specify a respective quantizor for each representation component, and wherein:
determining the respective bit reduction for each representation component includes determining the respective bit reduction based on the respective quantizor for each representation component.

46. The computer program product of claim 44, wherein estimating the storage size of the output representation includes:
for each representation component, estimating a respective average number of code bits for each bit width in the second bit width distribution; and
using the second bit width distribution to estimate the storage size includes multiplying the respective average number of code bits with the estimated frequencies of occurrence specified by the second bit width distribution.

47. The computer program product of claim 46, wherein:
the corresponding average number of bits is estimated based on bit widths in the input representation.

48. The computer program product of claim 43, wherein the digital data includes a digital image and the compression parameters specify an output pixel resolution of the digital image in the output representation, and wherein:
estimating the storage size of the output representation includes estimating the storage size based on the output pixel resolution.

49. The computer program product of claim 48, wherein the input representation specifies an input pixel resolution of the digital image, and wherein:
estimating the storage size based on the output pixel resolution includes using a square root of the ratio of the input pixel resolution and the output pixel resolution.

* * * * *